United States Patent
Yamakita

(10) Patent No.: US 6,366,698 B1
(45) Date of Patent: *Apr. 2, 2002

(54) PORTABLE TERMINAL DEVICE FOR TRANSMITTING IMAGE DATA VIA NETWORK AND IMAGE PROCESSING DEVICE FOR PERFORMING AN IMAGE PROCESSING BASED ON RECOGNITION RESULT OF RECEIVED IMAGE DATA

(75) Inventor: Tooru Yamakita, Fussa (JP)

(73) Assignee: Casio Computer Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,210

(22) Filed: Mar. 6, 1998

(30) Foreign Application Priority Data

Mar. 11, 1997 (JP) .............................. 9-055781
Mar. 19, 1997 (JP) .............................. 9-065746

(51) Int. Cl.$^7$ .............................. G06K 9/00; G06K 9/18; G06K 9/60; G06K 9/72; H04N 1/00
(52) U.S. Cl. ....................... 382/187; 382/165; 382/181; 382/186; 382/229; 382/306; 382/307; 358/400; 358/402; 358/403; 358/405
(58) Field of Search ................................ 382/181, 187, 382/190, 165, 186, 188, 229, 305, 306, 307, 309, 313, 314, 317; 358/402, 468, 473, 400, 405, 442, 401, 403

(56) References Cited

U.S. PATENT DOCUMENTS

| | | | |
|---|---|---|---|
| 4,823,395 A | 4/1989 | Chikauchi | 382/199 |
| 4,945,504 A | 7/1990 | Nakama et al. | 708/141 |
| 5,175,684 A | * 12/1992 | Chong | 704/3 |
| 5,287,199 A | 2/1994 | Zoccolillo | 358/402 |
| 5,461,488 A | * 10/1995 | Witek | 358/402 |
| 5,767,985 A | * 6/1998 | Yamamoto et al. | 358/402 |
| 5,805,298 A | * 9/1998 | Ho et al. | 358/402 |

(List continued on next page.)

FOREIGN PATENT DOCUMENTS

| | | | | |
|---|---|---|---|---|
| EP | 0354703 | * | 2/1990 | H04M/1/274 |
| EP | 0 465 011 A | | 1/1992 | |
| JP | 06-289989 A | | 10/1994 | |

OTHER PUBLICATIONS

Hui, et al "A Distributed Fax Messaging System" IEEE, pp. 393–397, 1995.*
Patent Abstracts of Japan, vol. 1997, No. 04, Apr. 30, 1997 and JP 08–331286 A (Toshiba Corp.), Dec. 13, 1996— Abstract only.

(List continued on next page.)

*Primary Examiner*—Leo Boudreau
*Assistant Examiner*—Daniel G. Mariam
(74) *Attorney, Agent, or Firm*—Frishauf, Holtz, Goodman, Langer & Chick, P.C.

(57) ABSTRACT

A user of a portable terminal writes sentences to be transmitted as an e-mail, a mail address, and information indicating that service a host device is requested to provide is "mail transmission" on paper as a memo. By using an image input unit installed in the portable terminal, the paper or the like is imaged. The portable terminal transmits the image data thus taken in to the host device. The host device analyzes received image data by using an image recognition unit. Upon recognizing by characters that the service requested by the portable terminal is "mail transmission", the host device starts a mail transmitting/receiving unit. The mail transmitting/receiving unit transmits the content of the written memo included in the image data to a terminal specified by the mail address included in the image data.

43 Claims, 23 Drawing Sheets

U.S. PATENT DOCUMENTS

| | | | | |
|---|---|---|---|---|
| 5,854,694 A | * | 12/1998 | Payne et al. | 358/473 |
| 5,862,321 A | * | 1/1999 | Lamming et al. | 709/200 |
| 5,867,281 A | * | 2/1999 | Nozoe et al. | 358/468 |
| 5,872,641 A | * | 2/1999 | Ozeki et al. | 358/434 |
| 5,873,077 A | * | 2/1999 | Kanoh et al. | 707/3 |
| 5,892,845 A | * | 4/1999 | Yamanaka et al. | 382/187 |
| 5,933,478 A | * | 8/1999 | Ozaki et al. | 379/93.24 |
| 6,057,942 A | * | 5/2000 | Sato | 358/435 |

OTHER PUBLICATIONS

Moore, L.C.: "Electronic Routing of Facsimile Images", Xerox Disclosure Journal, U.S., Xerox Corporation, Stamford, Conn., vol. 18, No. 1, Jan. 1, 1993, p. 73, XP000333950—entire document.

Cole, et al "An Architecture for a Mobile OSI Mail Access System", pp. 249–256, IEEE, 1989.*

*English language Abstract.

* cited by examiner

[E-mail transmission] = [abc@xyz.co.jp]

Hello! Thank you for your e-mail. As for the schedule of the next week, · · ·

Q

FIG.5A abc@xyz.co.jp

Hello! Thank you for your e-mail. As for the schedule of the next week, · · ·

[Mail inquiry]

from Mr.k

[E-mail transmission] = [abc@xyz.co.jp]

A portable terminal of XXXX put on the market this month has enriched mail functions, ......
By the way, ......

[E-mail transmission] = [abc@xyz.co.jp]

A portable terminal of XXXX put on the market this month has enriched mail functions, ......
~~By the way, ......~~

QRSTUVWXYZ

Meeting with Mr.k on August 18

FIG.13A

QRSTUVWXYZ

Meeting with Mr.k on August 18

FIG.13B

PORTABLE TERMINAL DEVICE FOR TRANSMITTING IMAGE DATA VIA NETWORK AND IMAGE PROCESSING DEVICE FOR PERFORMING AN IMAGE PROCESSING BASED ON RECOGNITION RESULT OF RECEIVED IMAGE DATA

BACKGROUND OF THE INVENTION

The present invention relates to portable terminal device for transmitting image data via a network and to an image processing device for performing an image processing based a recognition result of received image data.

This application is based on Japanese Patent Application No.9-55781, filed Mar. 11, 1997 and Japanese Patent Application No.9-65746, filed Mar. 19, 1997, the content of which is incorporated herein by reference.

In recent digitalized society, various documents and drawings, especially for business, are handled in an electronic form. In some cases, it is desired to store information as an electronic file even if the content is no more than memos.

In the most general method for generating an electronic document, an application program for documentation is started on a personal computer and a person who is making a document inputs information character by character through a keyboard. In the most general method for generating an electronic drawing, an application program for drawing is started and a person who makes drawings inputs data for the drawing through a keyboard and a mouse device.

Recently, electronic cameras have come into wide use. An electronic camera reads image data of an object to generate digital data. If the electronic camera is connected to a personal computer or the like via a predetermined interface, the image data read by the electronic camera can be processed by that personal computer. Therefore, by reading a document written on paper with an electronic camera, inputting image data read by the electronic camera to a personal computer or the like, and executing character recognition processing, the document written on paper can be converted into an electronic file.

An electronic file is generally formed by using a keyboard and a mouse. In specific cases, image recognition processing is carried out on image data read by using an image scanner.

However, it cannot always be said that the manipulation using the keyboard or mouse is easy for all users. There are also users who are not good at this type of manipulation. Furthermore, in the case where the content of a memo is to be converted into an electronic file, it is necessary to activate an application program for editing documents and then start the manipulation each time key input is needed. This is troublesome whereas handwriting can be done in a short time.

On the other hand, in the method of imaging a written content on paper or the like by using an electronic camera or the like, it is difficult to input only a necessary area and there is a high possibility that a document other than a document desired to be subjected to image recognition is also input. In this case, it becomes necessary to display image data read by camera on a personal computer display and specify an image recognition area, or amending a document obtained as an image recognition result. This is also troublesome.

In the above described method using an electronic camera, image data obtained at a remote location (such as a business trip destination) cannot be converted into an electronic file immediately on that site if a user does not carry an electronic camera and a notebook computer or the like. Furthermore, a character recognition software of good performance is in general large in program size. It is not desirable to install such a large size program on a simple portable terminal or the like.

Furthermore, in recent years, an electric mail (e-mail) is rapidly coming into wide use for business use and for individual use. The e-mail has a wide range of applications ranging from, for example, a small scale inter-office mail system for transmitting liaison matters in a LAN (local area network) to such a system that an e-mail is sent to a desired other party located in all over the world via the Internet.

When transmitting an e-mail, usually the user inputs a document to be transmitted and a destination address by using keys and thus writes a letter. Then the user sends out the letter to the network by clicking, for example, a "transmission" button on an e-mail application. Or in some cases, the document to be transmitted is obtained by scanning sentences printed on paper or the like as image data by means of an image scanner or the like and executing character recognition processing on the image data, instead of inputting the document to be transmitted. Upon receiving a letter (actually a packet storing the letter), the network transmits that letter to the destination specified by the user in accordance with a destination address set in that letter.

When transmitting e-mail, usually a character string input by the user by means of keys or information at least converted to a string of character codes is sent out to the network. The destination address is input by the user.

There are strong demands for a simple interface in use of e-mail. For example, there are a lot of users who desire to input a string of characters by using a method other than the key input. In a form known as the character input method other than the key input, handwriting characters on the display screen of a terminal device with a special pen. In some cases, however, it is difficult to draw fine patterns. When it is desired to send a content already written on paper or the like as it is as an e-mail, it becomes necessary to input the content again by using the special pen and this is troublesome. Furthermore, there are a lot of scenes in which the user sends an e-mail from the movement destination by using a portable terminal. Even if a character string written on paper or the like is taken in as image data by using some means, however, the content thus taken in cannot be sent as an e-mail document provided that the portable terminal does not have software for character recognition. In general, character recognition software of good performance has a large program size. It is not desirable to install such program on a simple portable terminal or the like.

BRIEF SUMMARY OF THE INVENTION

Accordingly, it is an object of the present invention to provide a data transmitting/receiving device capable of transmitting an e-mail having a simple structure and with easy operation.

According t o the present invention, there is provided a host device for a system connecting various terminals via a network, comprising means for receiving data including image data transmitted from a terminal and executing character recognition on information of transmission destination contained in the image data; and means for transmitting information to be transmitted included in the received data to a terminal of transmission destination obtained by the character recognition.

According to the present invention, there is provided a portable terminal device comprising means for reading, as an image, data indicating transmission destination and transmission data so as to be distinguishable from each other; means for inputting the image data thus read and processing instruction for the image data; and means for transmitting the image data and the command indicating the processing instruction to a host device connected to a network.

According to the present invention, a document including a desired handwritten memo or the like is taken in as image data by a camera included in a portable terminal, and that handwritten memo or the like can be converted to an electronic file by only requesting a host device to perform recognition processing. In this way, the present invention provides a user interface improved in manipulation performance. The image is recognized by extracting only a region inside a closed loop pattern, a region including an underlined character string, or a region including a pattern drawn with a specific color. As a result, only required information is recognized accurately.

Furthermore, in the present invention, a handwritten memo or the like can be simply transmitted to a desired other party as an e-mail or a fax by taking in a document including a desired character string as image data with a camera or the like included in a portable terminal and requesting a necessary service to the host device. In this way, the present invention provides a user interface improved in manipulation performance.

Furthermore, since image data processing required to be performed at high speed, especially pattern recognition processing and character recognition processing are not executed on the side of the portable terminal, it is possible to obtain a result of sophisticated image data processing without providing a large capacity memory or a high performance processor.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 5A and 5B show first examples of image data input by a camera and displayed on a display unit of the portable terminal;

FIG. 7 shows third examples of image data input by a camera and displayed on the display unit of the portable terminal;

FIGS. 8A and 8B show fourth examples of image data input by a camera and displayed on the display unit of the portable terminal;

FIGS. 13A and 13B show examples of discrimination of an image to be recognized;

DETAILED DESCRIPTION OF THE INVENTION

A preferred embodiment of a data transmitting/receiving device according to the present invention will now be described with reference to the accompanying drawings.

Figure 1:
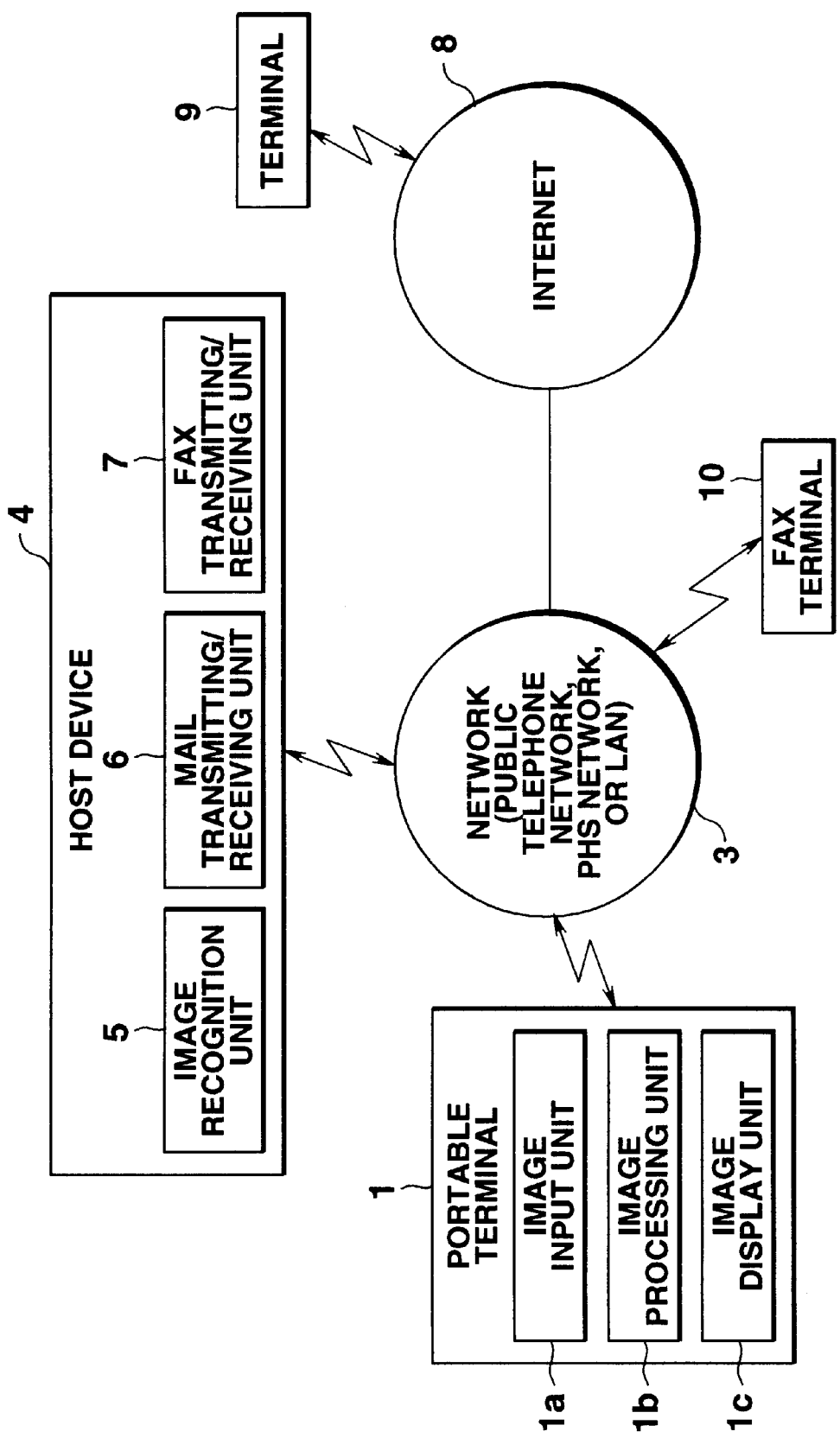
FIG. 1 is a system configuration diagram of an embodiment of the present invention.

FIG. 1 is a system configuration diagram of a first embodiment of the present invention. A portable terminal 1 has a communication function, and is capable of requesting another device connected to a network 3 to perform given data processing, receiving a result thereof, and displaying it. The portable terminal 1 is connected to the network 3 by using a scheme of transmitting/receiving data on a radio channel via a nearby base station, a scheme of transmitting/receiving data to/from a device having a communication function (optical link unit) by using Ir (infrared ray) communication or the like, or a wired scheme of transmitting/receiving data. The portable terminal 1 has an image input unit 1a including an electronic camera. The portable terminal 1 has a function of sending image data taken in by using the image input unit 1a to another device (such as host device 4) connected to the network 3 and requesting the other device to perform image processing. Furthermore, the portable terminal 1 is also capable of processing the image data taken in by using the image input unit 1a, and displays image data taken in or processed on an image display unit 1c.

The network 3 is a public telephone network, a PHS network, or a LAN. The host device 4 is accommodated in the network 3. The host device 4 is a server machine. In accordance with a request transferred from the portable terminal 1, the host device 4 executes data processing. The host device 4 has an image recognition unit 5, a mail transmitting/receiving unit 6, and a fax transmitting/receiving unit 7. The image recognition unit 5 executes pattern recognition processing or character recognition processing on image data transmitted from the portable terminal 1, and detects a predetermined pattern and a predetermined character string contained in the received image data. The mail transmitting/receiving unit 6 has a function of transmitting/receiving an e-mail to/from another terminal 9 connected to via, for example Internet 8, and is capable of transmitting character string data recognized by the image recognition unit 6 to the other terminal 9. The fax transmitting/receiving unit 7 has a function of transmitting/receiving a fax signal to/from a fax terminal 10 connected via, for example, the network 3, and is capable of transmitting image data sent from the portable terminal 1 to the fax terminal 10.

When the user of the portable terminal 1 wishes to of transmit a content written on, for example, paper or the like as a memo to the terminal 9 as an e-mail, the user adds the mail address of the terminal 9 and information indicating that service which is requested to the host device 4 is "mail transmission" to the written memo as image information on the paper, takes in the image on the paper by using the image input unit 2 (the electric camera connected to the portable terminal 1), and transmits the image data thus taken in to the host device 4. The host device 4 analyzes the received image data by using the image recognition unit 5. Upon recognizing that the service which is requested to the host device 4 from the portable terminal 1 is "mail transmission," the host device 4 starts the mail transmitting/receiving unit 6, and transmits the content of the written memo contained in the image data to the mail address contained in the image data.

In the same way, when the user of the portable terminal 1 wishes to transmit the content written on, for example, paper or the like as a memo to the fax terminal 10 as a fax transmission, the user adds the telephone number of the fax terminal 10 and information indicating that service the host device 4 is requested to provide is "fax transmission" to the written memo as image information on the paper, takes in the image on the paper by using the image unit 2, and transmits the image data thus taken in to the host device 4. Upon recognizing that the service requested by the portable terminal 1 is "fax transmission," the host device 4 starts the fax transmitting/receiving unit 7, and transmits the content of the written memo contained in the image data to a device having the telephone number contained in the image data, as a fax transmission.

The host device 4 may be formed by a single computer. Or an image processing server device, a mail server device, and a fax server device may be formed by respectively independent computers. The host device 4 is a server computer provided at an Internet provider, a personal computer communication company, or an Intranet managing section.

When it is desired to perform an e-mail transmission or a fax transmission in the system of the present embodiment, it is necessary only to scan a content written on the document desired to be transmitted by using a camera or the like and transmit the scan data to the host device 4 as image data. Therefore, the user can receive the e-mail transmission service or fax transmission service by only writing desired characters and/or figures on paper or the like as a memo and reading it with the camera. Furthermore, the portable terminal 1 needs only to have the function of taking in image data and the communication function as a constituent condition for receiving the above described service. As a result, a reduced weight and a lowered cost can be accomplished.

When the user of the portable terminal 1 wishes to convert a memo handwritten on, for example, paper or the like into an electric file, the user draws a closed loop pattern so as to surround a region on paper in which the memo or the like is written, and the image on paper is read by using the image input unit 1a. The image processing unit 1b analyzes the image data read by the input unit 1a. Upon detecting a closed loop pattern, the image processing unit 1b extracts image data of a region inside the closed loop pattern. In the extracted image data, unnecessary regions have been deleted from the memo or the like written on paper. The portable terminal 1 transmits image pattern data extracted by the image processing unit 1b to the host device 4 via the network 3.

Upon receiving image pattern data from the portable terminal 1, the host device 4 causes the image recognition unit 5 to analyze the image pattern. Here the image pattern analyzed and recognized by the image recognition unit 5 is the content itself written on paper or the like by the user, and an unnecessary image is removed. Therefore, the host device 4 can obtain only the content written on paper or the like by the user as a result of recognition.

Alternatively, such a configuration that the processing of the image processing unit 1b is executed by the host device 4 may be adopted. In this case, the portable terminal 1 transmits the image read by using the image input unit la as it is, and the image recognition unit 5 extracts image data located in a region inside the closed loop pattern, and analyzes the extracted image pattern.

The result of recognition performed by the image recognition unit 5 may be stored in the host device 4, or it may be transmitted to the portable terminal 1 automatically or in response to demands. In this case, the portable terminal 1 displays the recognition result received from the host device 4 on the image display unit 1c. Furthermore, the result of recognition performed by the recognition unit 5 may be transmitted to a predetermined terminal device. Furthermore, retrieval processing may be executed by using the recognition result as a keyword, and the recognition result may be translated to a predetermined language.

The image recognition unit 5 may be implemented as a function obtained by execution of a predetermined program by the host device 4, or may be implemented by a computer which is independent of the host device 4.

When it is desired to convert characters or figures written on paper or the like as a memo into an electric file (digital data) in the system of the present embodiment, the user needs only draw a closed loop pattern so as to surround a region on paper in which the memo or the like is written, image it with a camera or the like, and transmit the image data (or image data subjected to predetermined image processing) to the host device 4. In other words, it is only required for a user to surround the memo or the like with a closed loop pattern and imaging it with a camera or the like. It is very simple. As the constituent condition for recognizing the above described memo or the like, the portable terminal 1 need not have the character recognition function, and needs only have the function to read an image and the communication function. Depending on the configuration, the function of detecting a closed loop pattern is also required. Therefore, the weight and cost can be reduced.

Figure 2:
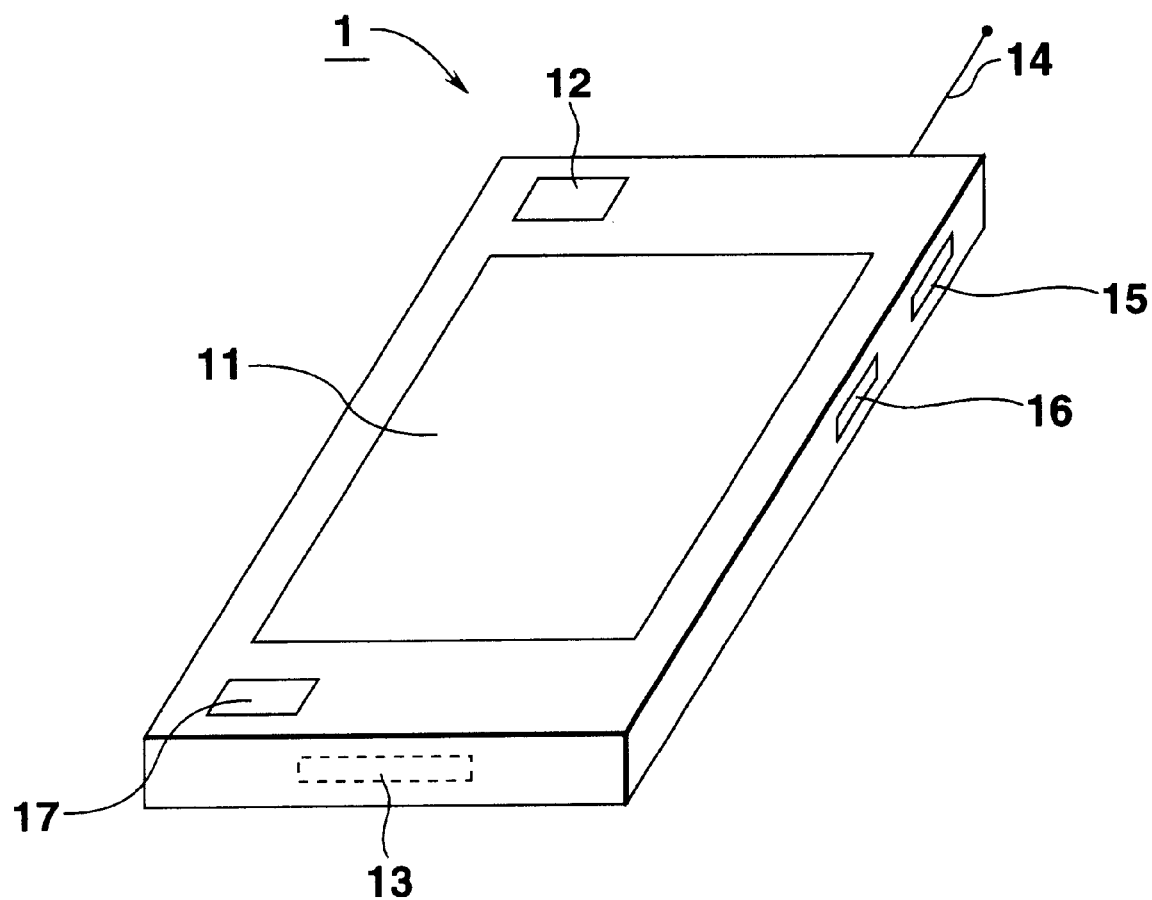
FIG. 2 is an exterior view of a portable terminal.

FIG. 2 is an exterior view of the portable terminal 1. The portable terminal 1 has an LCD display unit 11, a camera 12, an IC card slot 13 and a radio communication antenna 14. Furthermore, in order to support other communication schemes, the portable terminal 1 has an Ir communication socket 15 and a wire communication socket 16. The LCD display unit 11 has a touch panel function. Therefore, the portable terminal 1 can process handwritten input information. Numeral 17 denotes a power switch.

Figure 3:
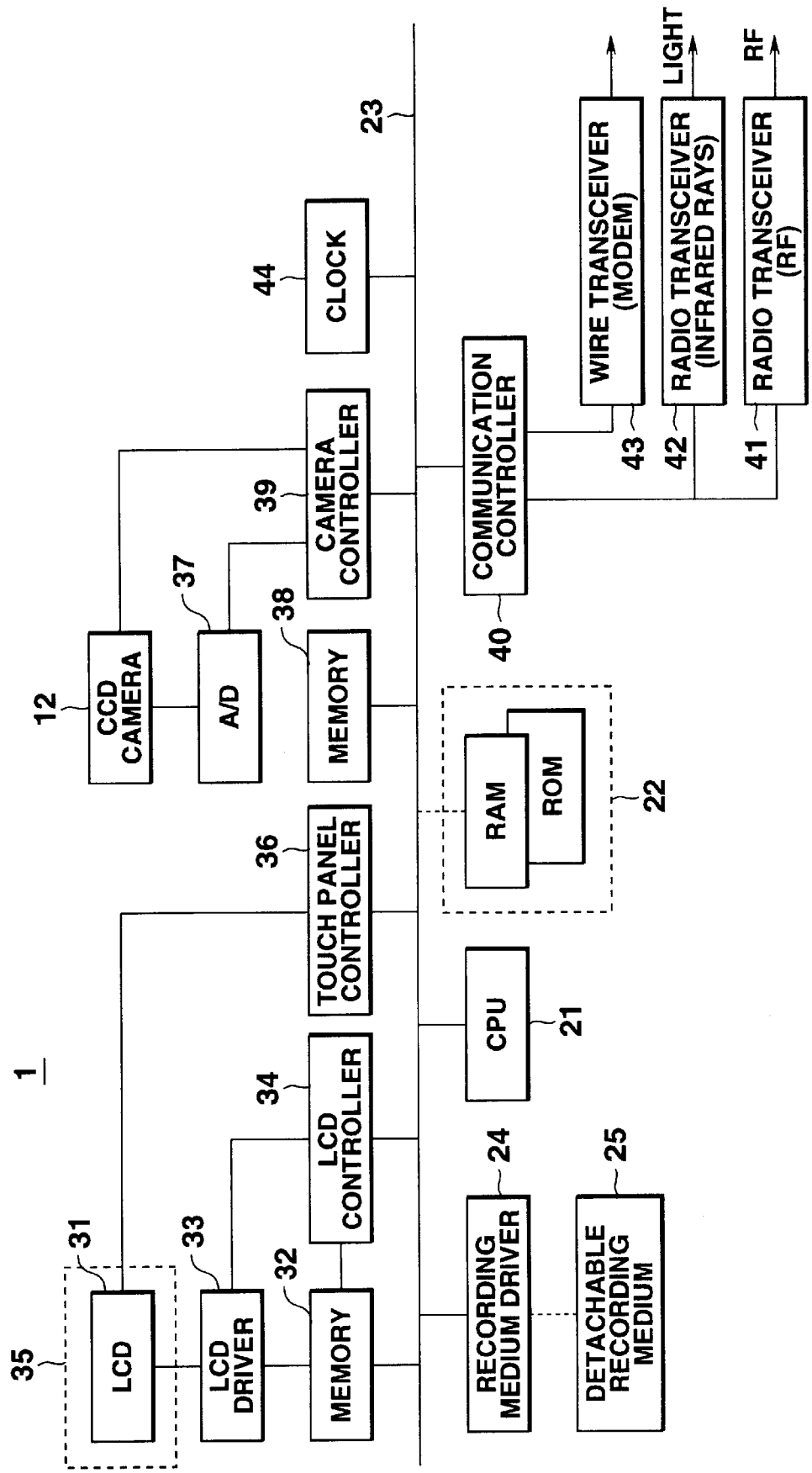
FIG. 3 is a configuration diagram of the portable terminal.

FIG. 3 is a configuration diagram of the portable terminal 1. A CPU 21 executes a program stored in a storage device (a ROM and a RAM) 22. The CPU 21 and the storage device 22 are interconnected via a bus 23.

The storage device 22 is formed by a semiconductor memory, a magnetic recording medium, or an optical recording medium, and stores programs and data. The storage device 22 may be fixedly mounted in the portable terminal 1, or it may be detachably mounted.

A recording medium driver 24 is connected to the bus 23. The recording medium driver 24 is a device for reading data stored in a detachable recording medium 25 (including a semiconductor memory, a magnetic disk, an optical disk, or an optical magnetic disk) or writing data into the detachable recording medium 25. It is assumed that an IC card is used as an example of the detachable recording medium 25. The CPU 21 can also execute a program stored in the detachable recording medium 25.

Programs and data recorded in the storage device 22 may be received from another device connected via a communication line or the like and recorded therein. Furthermore, the CPU 21 may use a program and data stored in a storage device installed on the side of another device via a communication line or the like.

A unit corresponding to the LCD display unit 11 is formed of a liquid crystal display (LCD) 31, a memory 32 for storing information to be displayed on the liquid crystal display (LCD) 31, an LCD driver 33 for outputting information stored in the memory 32 to the liquid crystal display 31 under the control of the LCD controller 34, an LCD controller 34 for controlling the memory 32 and the LCD driver 33, a touch panel unit 35, and a touch panel controller 36 informing the CPU 21 of input information detected by the touch panel unit 35.

The camera 12 is, for example, a CCD camera. Output of the CCD camera 12 is converted to digital data of bit map form by an A/D converter 37, and written into a memory 38. A camera controller 39 outputs image data stored in the memory 38 to the bus 23 based on a command given by the CPU 21.

When sending out data from the portable terminal 1, a communication controller 40 generates a transmission packet based on a command given by the CPU 21 and transmits it to a radio transceiver 41 or 42, or a wire transceiver 43. When receiving data, the communication controller 40 outputs data stored in a packet received via the radio transceiver 41 or 42, or the wire transceiver 43 onto the bus 23. The radio transceiver 41 is connected to the radio communication antenna 14 shown in FIG. 2, and transmits/receives radio data to/from a radio base station. The radio transceiver 42 is a transceiver for performing Ir communication. The wire transceiver 43 is, for example, a modem. The radio transceiver 42 and the wire transceiver 43 are optionally mounted. The portable terminal 1 furthermore has a clock 44.

Figure 4:
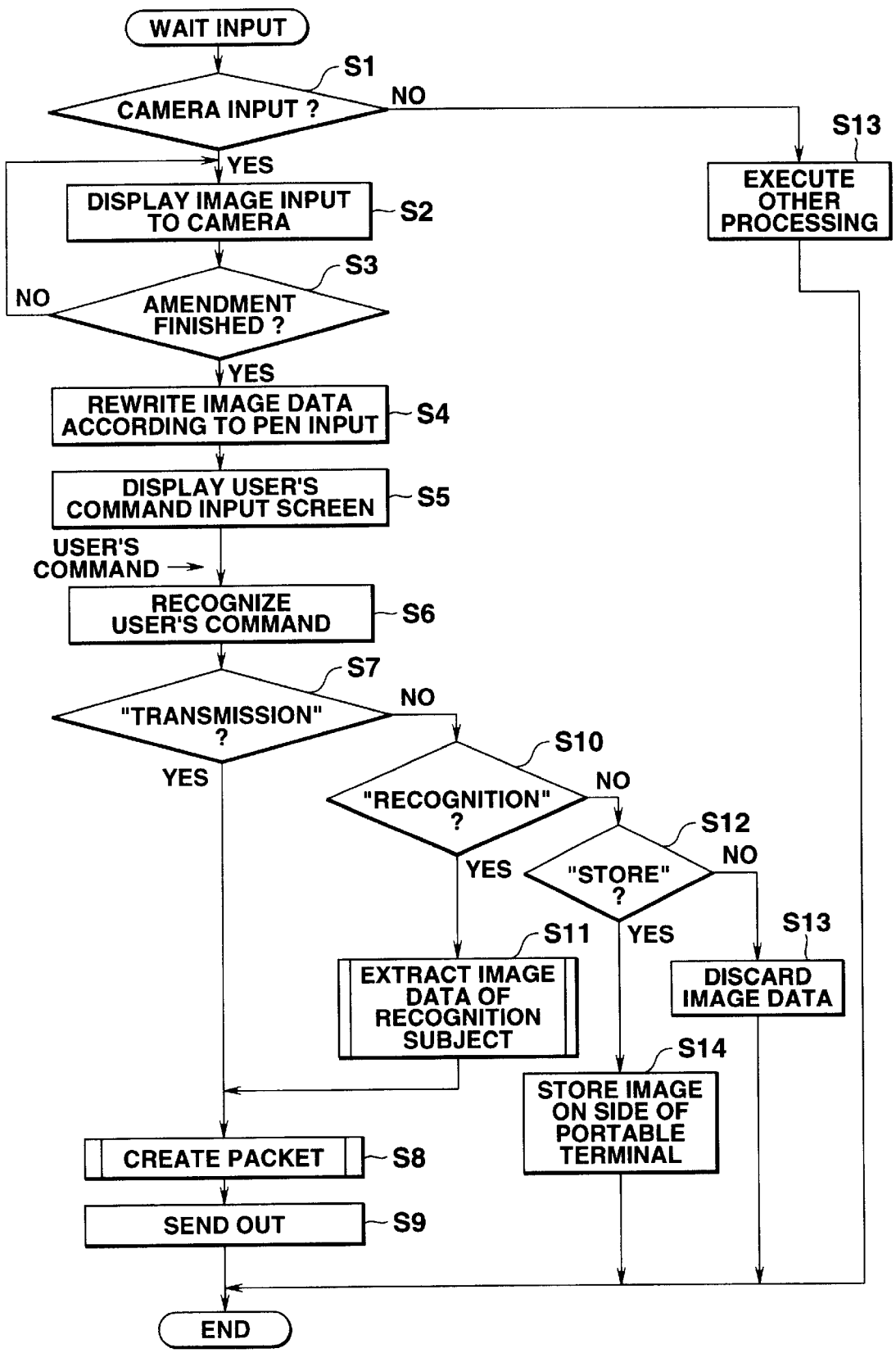
FIG. 4 is a flow chart of processing of transmitting image data taken in by imaging with a camera in the potable terminal to a host device and requesting a predetermined service.

FIG. 4 is a flow chart showing processing of transmitting image data taken in by the camera 12 of the portable terminal 1 to the host device 4 and requesting desired service. Programs implementing respective functions shown in this flow chart are stored in the storage device 22 in a form of program code which can be read by the CPU 21.

This flow chart shows processing performed after the portable terminal 1 detects some input in an input wait state. Furthermore, in this embodiment, an example in which characters or the like written by the user as a memo are input by a camera will now be described.

At step S1, it is determined whether the detected input is an input from the camera 12, processing of step S2 and subsequent steps is executed. If it is an input from different one, other processing corresponding to that input is executed at step S13. If the characters or the like are input by the camera 12 by the user, processing of step S2 and subsequent steps is started. If there is the camera input, time information output from the clock 44 is stored.

At step S2, image data taken in by the camera 12 is displayed on the LCD display unit 11. In other words, image data taken in by the camera 12 is written into the memory 32 of the LCD display unit 11, and the image data is displayed on the liquid crystal display 31. As a result, the user can see the input image on the spot. FIG. 5A shows an example of display of image data taken in by the camera. In this example, the user writes mail sentences, "Hello! Thank you for your e-mail. As for the schedule of the next week, . . ." as a memo. Furthermore, "E-mail transmission" is written as service of a request made to the host device 4 and "abc@xyz.co.jp" is written as address of mail transmission destination. A camera input range Q having these messages written therein is imaged. Each of the specified service and the address is put in brackets.

For transmitting image data to the host device 4 and causing the host device 4 to perform data transmission processing in accordance with information contained in that image data, the information specifying service and information specifying the mail transmission destination must be recognizable with respect to the mail sentences (mail content) as described before with reference to FIG. 1. In the example of FIG. 5A, it was made a rule to put each of the information specifying the service and the information specifying the mail transmission destination in brackets. The brackets may be replaced with other punctuation, such as parentheses. Alternatively, it may be made a rule to effect character decoration such as underlines on the information specifying the service and the information specifying the mail transmission destination. Furthermore, the service classification may be associated with a color. For example, it is determined beforehand that a command indicating the mail transmission service is represented by a red color and a command indicating the fax transmission service is represented by a blue color. It is made a rule that a content written with such a color specifies the transmission destination. In an example shown in FIG. 5B, "abc@xyz.co.jp" is written with the red color. By analyzing image data containing this image, therefore, the host device 4 can recognize the service requested by the user as the "E-mail transmission" and the transmission destination address as the "abc@xyz.co.jp." In any event, the command indicating the service and the information specifying the mail transmission destination are distinguished by discrimination information such as the symbols, character decoration, or color.

Figure 6A:
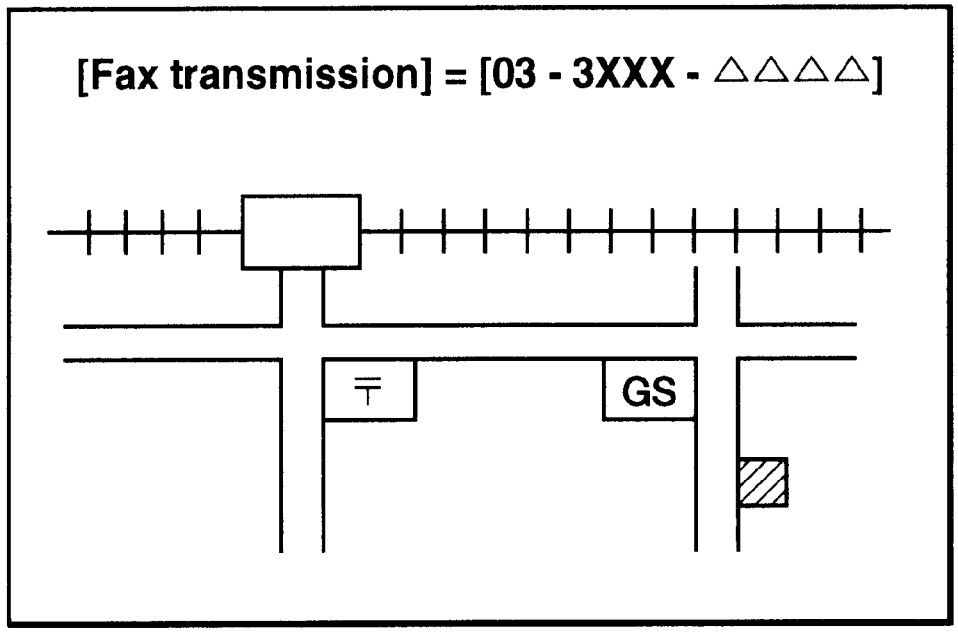
FIGS. 6A and 6B show second examples of image data input by a camera and displayed on the display unit of the portable terminal.

When it is desired to transmit an image input by the camera 12 to a desired fax terminal as a fax transmission, the user writes "Fax transmission" near a memo (here, a map) desired to be transmitted as the requested service for the host device 4, and puts the character string in brackets, as shown in FIG. 6A. Furthermore, the user writes the telephone number of the fax terminal of the transmission destination as well together with brackets.

Figure 6B:
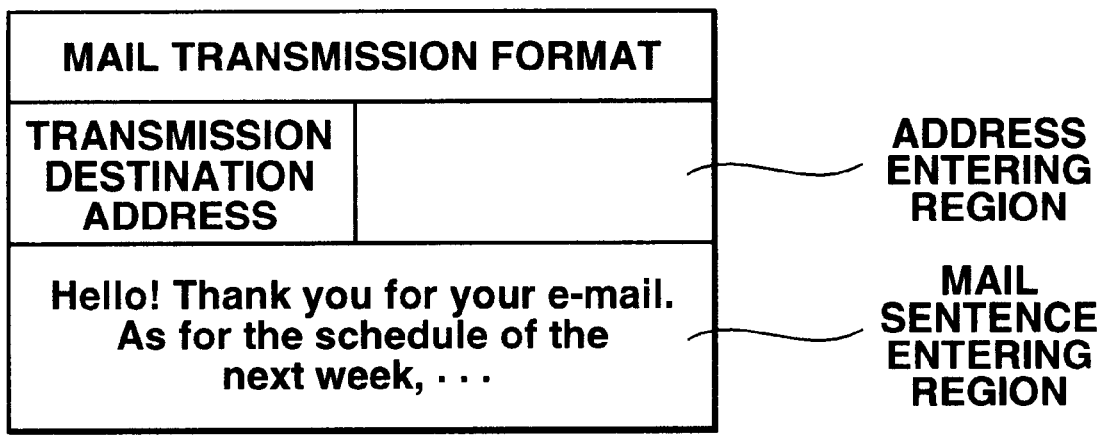

When reading the content to be transmitted as an e-mail or fax transmission by using the camera 12, a predetermined format may be used. FIG. 6B shows an example of a format for entering the content desired to be transmitted as an e-mail. The format has an address entering region and a mail sentence entering region.

Figure 7:
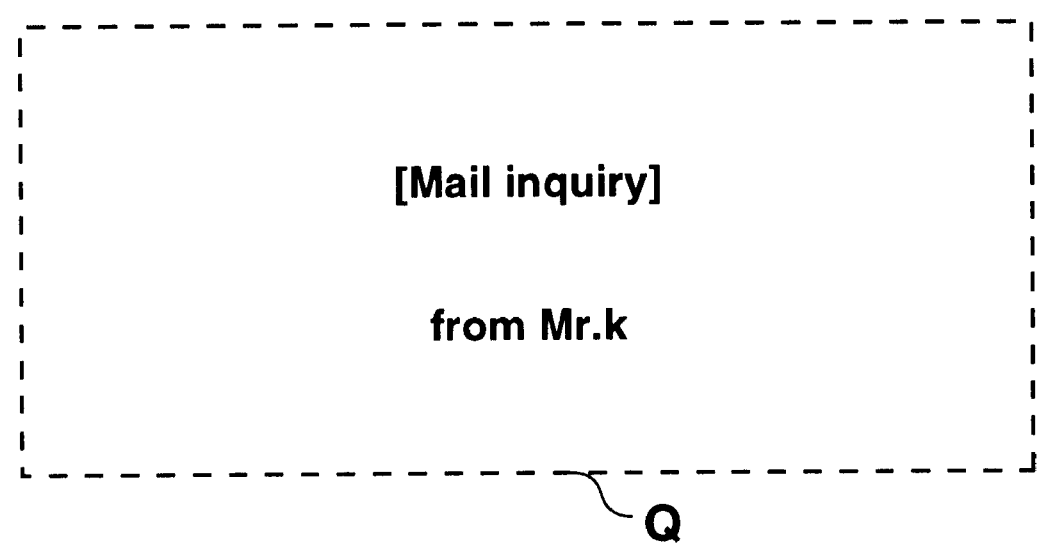

As for the service that the host device 4 is requested to provide, a received mail inquiry is also possible besides transmission of data to a desired device such as an e-mail transmission or a fax transmission. In the received mail inquiry, it is requested to download a mail addressed to the user which is arrived at a mail server (the mail transmitting/receiving unit 6 of FIG. 1) to the portable terminal 1. In this case, the user writes "Mail inquiry" on paper or the like as a memo of a request command for the host device 4, and puts the character string in brackets as shown in FIG. 7. When the user wishes to read only a mail coming from a particular person, the user writes, for example, "from Mr. K" on paper. The camera inputting range Q of the paper having the written memo thereon is imaged by the camera 12, and the input image data is transmitted to the host device 4.

Returning to the flow chart of FIG. 4, it is determined at step S3 whether the camera input image data is amended. Here, an example of manipulation of the user performed when a screen shown in FIG. 8A is displayed by the processing of step S2 will now be described. When the user wishes to amend the content of the displayed screen, the user inputs the amending content on the LCD display unit 11 by using a handwriting pen. For example, when "By the way," within "A portable terminal of xxxx put on the market this month has enriched mail functions . . . . By the way, . . . ." is unnecessary, a deletion symbol is written on "By the way," by using the handwriting pen on the LCD display unit 11 as shown in FIG. 8B. When the amendment of the displayed content is finished, the user inputs the amendment completion. This processing is performed by, for example, displaying an "amendment end" button as well when displaying the image input by the camera 12 on the LCD display unit 11. The user presses that button with the handwriting pen. In the case where there is no amendment, the user presses the amendment end button without amending the image input by the camera 12.

In keeping with the above described operation of the user, steps S3 and S4 are executed. In other words, if it is detected at step S3 that the amendment end button is pressed, processing advances to step S4. When the user presses the amendment end button without amending image data displayed on the LCD display unit 11, step S4 is skipped and the processing proceeds to step S5.

At step S4, the image data is updated according to pen input from the user. In other words, a locus pattern pressed on the LCD display unit 11 by the pen input is overwritten in the memory 32 as data of a bit map form. At this time, the image data currently displayed on the LCD display unit 11 is stored in the memory 32. Therefore, the image data taken in by camera and the locus pattern written by pen input are merged.

At step S5, a screen for causing the user to specify whether the image taken in by camera should be transmitted to the host device 4 is displayed on the LCD display unit 11.

At this time, the image data stored in the memory 32 is saved in the RAM of the storage device 22. Image data of the screen for causing the user to specify desired service is read out from the ROM of the storage device 22 and written into the memory 32. The user's command input screen includes buttons for inputting processing commands, such as "transmission", "recognition", "storage", and "cancel".

If the user inputs processing command on the user's command input screen, i.e., the user presses one of displayed buttons, then processing of step S6 and the subsequent steps is executed. First, the user's command is recognized at step S6. At step S7, it is determined whether the user's command is "transmission". If the transmission button is pressed, the user's command is judged to include a command such as an e-mail transmission or a fax transmission and the processing proceeds to step S8.

At step S8, a packet for storing image data when transmitting the image data taken in by camera to the host device 4 is created. The packet creation processing will be described later. At step S9, the packet created at step S8 is sent out to the network 3 shown in FIG. 1.

If the user commands "recognition" on the user's command input screen, then it is detected at step S10 that the user presses the recognition button, the user's command is determined to be image recognition service, and the processing proceeds to step S11.

Figure 9:
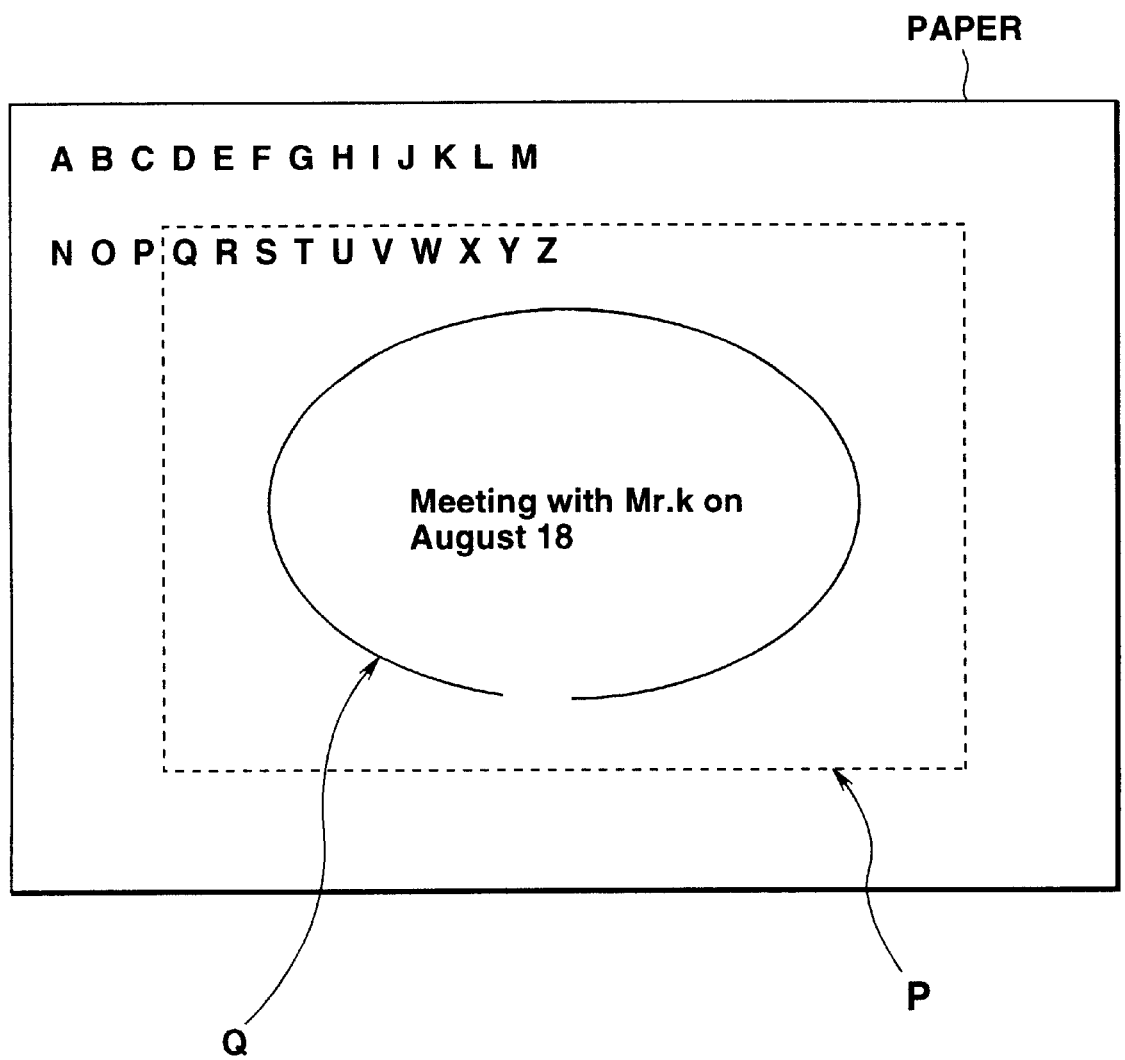
FIG. 9 is a diagram illustrating the concept of "recognition" of the present embodiment.

FIG. 9 is a diagram illustrating the concept of the image recognition service of the present embodiment, and it shows an example of an image obtained when a memo handwritten on paper by the user is imaged by the camera. In this example, a memo is written as "Meeting with Mr. K on August 18" in a blank space of paper having alphabets A through Z previously written thereon, and that memo is read by the camera 12. In order to discriminate between a portion desired to be subjected to character recognition and remaining portions, the user draws such a closed loop as to surround the memo sentence desired to be subjected to character recognition on paper. This closed loop may be drawn on paper by using an ordinary pen or pencil.

The user scans the paper so that at least the memo sentence desired to be subjected to character recognition and the closed loop pattern surrounding the memo sentence may be read. At this time in the example shown in FIG. 9, unnecessary images located in a camera inputting range P, i.e., alphabetic letters Q through Z are read as image data together with the memo.

Even in this state, the image recognition processing is executed, in the image processing of the present embodiment, with respect to a region "a" located inside the closed loop pattern. Therefore, alphabetic letters Q through Z located outside the closed loop pattern are not recognized, but only the memo written as "Meeting with Mr. K on August 18" is recognized. In this way, only the desired pattern can be recognized while deleting unnecessary patterns with a user interface.

Returning to the flow chart of FIG. 4 again, image data input by the camera 12 is temporarily stored in a RAM region of the storage device 22, and image data of the recognition subject is extracted from the stored image data at step S11. In the example shown in, for example, FIG. 9, the region located inside the closed loop pattern is regarded as the region of the recognition subject, and the image data of that region is extracted. The processing of step S11 will be described later in detail. Subsequently, at step S8, the packet for transmitting the image data extracted at step S7 to the host unit 4 is created. The processing of step S8 will also be described later. At step S9, the packet created at step S8 is sent out to the network 3 shown in FIG. 1.

On the other hand, if the user's command is judged at step S10 not to be "recognition," it is determined at step S12 whether the user presses the storage button. If the user presses the storage button, image data is stored on the side of the portable terminal 1 at step S14. On the other hand, if the user does not press the storage button, it is considered that the user presses the cancel button and the image data is discarded at step S13.

Upon reading the image in which the region of the recognition subject is represented by a substantially closed loop pattern, the portable terminal 1 regards only the region inside the substantial closed loop pattern as the region of the recognition subject, extracts the region, and sends the extracted image data of the region of the recognition subject to the host device 4. As described above, the extracted image data contains the region desired to be actually subjected to image recognition, and an unnecessary image is deleted therefrom.

Figure 10A:
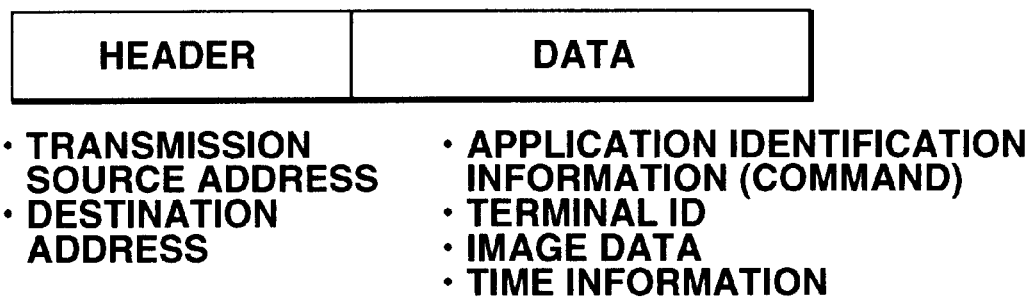
FIG. 10A is a diagram showing the structure of a packet send out from the portable terminal.

FIG. 10A is a diagram showing the structure of a packet sent out from the portable terminal 1. This packet is created at step S8 shown in FIG. 4.

Each packet is formed of a header portion and a data portion. The header portion stores a transmission source address, a destination address, and the like. Which system addresses stored as the transmission source address and the destination address belong to depends upon the network configuration to which the present embodiment is applied. In the TCP/IP communication, for example, IP addresses are stored.

In the data portion, application identification information, terminal ID, image data, time information, and the like are stored. The application identification information is information identifying an application program to be started in the destination terminal (here, the host device 4). In other words, the application identification information is a command for starting a predetermined program in the terminal of the reception destination. In the present embodiment, a command identifying the mail transmission, fax transmission, mail readout, fax readout, recognition, or the like is set. In the TCP/IP communication, the application identification information is specified as a port number.

The terminal ID is an identification number of the portable terminal 1. The image data is image data taken in by the camera, and is compressed when stored in a packet. If there is an input with the handwriting pen, the locus pattern of the pen input is also merged as image data as described before with reference to FIG. 8. The time information is information representing the time when the image data sent out to the host device 4 was input by the camera.

Figure 10B:
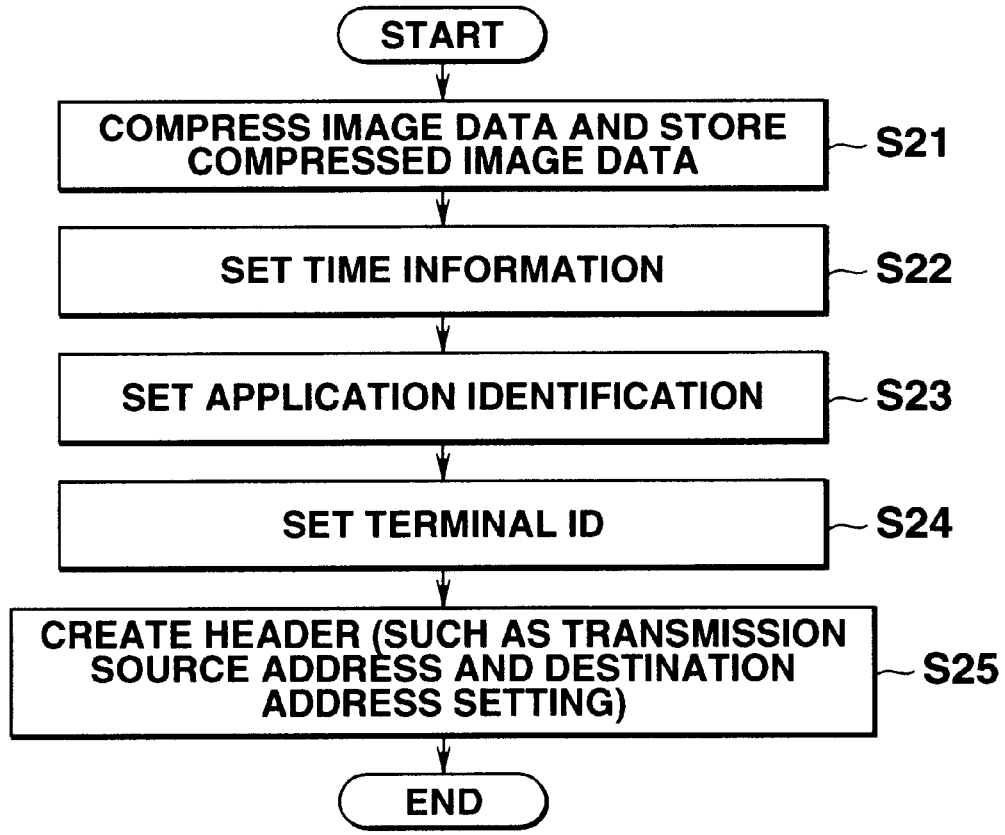
FIG. 10B is a detailed flow chart of packet creation processing.

FIG. 10B is a detailed flow chart of the packet creation processing of step S8 shown in FIG. 4. At step S21, the image data to be transmitted to the host device 4 is compressed and stored in the data portion. The compression scheme is, for example, the JPEG. At step S22, the time information representing the time when the above described image data is input by the camera is set. At step S23, information identifying an image data analysis and recognition program is set as the application identification information. At step S24, a terminal ID is set as the information identifying the portable terminal 1 (i.e., information identifying its own device). Furthermore, at step S25, the header portion is created. In the header portion, at least the address of the portable terminal 1 (i.e., the address of its own device) and the address of the host device 4 are set as the transmission source address and the destination address, respectively.

The packet created as described above is sent out to the network 3. In accordance with the destination address of the packet, the network 3 transmits the packet to the host device 4.

Figure 11:
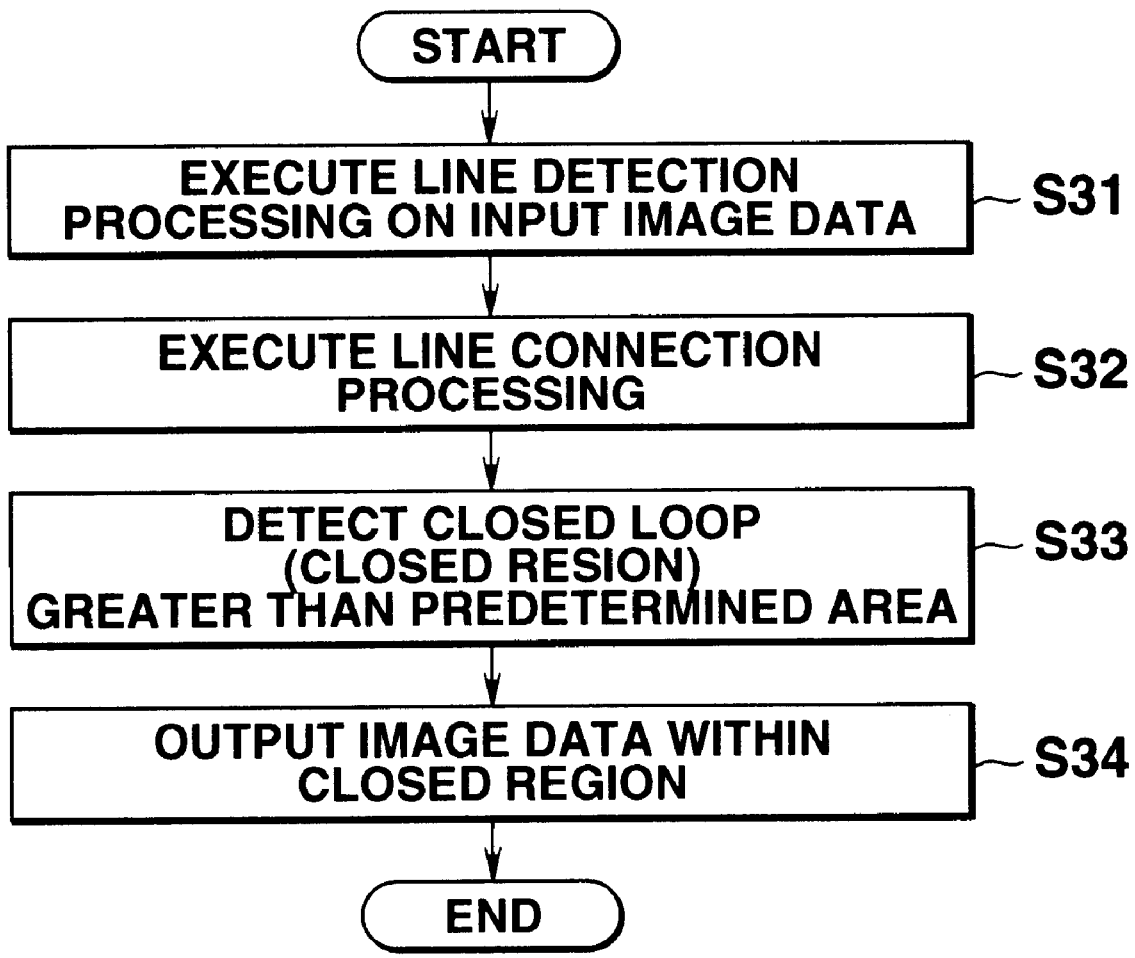
FIG. 11 is a flow chart of processing for extracting image data of a recognition subject.

FIG. 11 is a detailed flow chart of the processing of step S11 shown in FIG. 4, and it shows processing for extracting the image data of the recognition subject. At step S31, the image data read by the camera 12 is read out from the RAM region of the storage device 22 and subjected to pre-processing in order to remove noise of the image data, and thereafter line detection processing is executed. The line detection processing is a known technique. For example, when density distribution or color distribution of the image data is examined, a "line" can be detected by connecting points each having a large change ratio. Also in a boundary between a certain region and another region, the change ratio of the density distribution or color distribution becomes large. However, discrimination between a "line" and a "boundary between regions" is performed in a conventional technique. By thus examining the density distribution or color distribution in the entire region of the image data subjected to the above described pre-processing, the "line" contained in the image is detected.

At step S32, line connection processing for connecting a break of the "line" detected at step S31 is executed. For example, in the example shown in FIG. 9, the closed loop pattern substantially surrounds the handwritten memo. However, a part thereof is broken, and there is so-called "line break." The line connection processing is processing for repairing such a "line break." This is also a known technique. For example, from a tip of a line on which the "line break" occurs, a segment of a line having a predetermined length is extended in the extension direction of the line. Around the tip of the line, the extended segment of the line is revolved in a predetermined angle range. If the segment of the line comes in contact with another line, processing for connecting those two lines is performed. By this line connection processing, the closed loop pattern interrupted in part (substantially closed loop pattern) is repaired to become a completely closed loop pattern.

Among closed loop patterns contained in the image data, such a closed loop pattern that the area of the region surrounded thereby is greater than a predetermined value is detected at step S33. For example, there is a possibility that an alphabetic letter "Q" in FIG. 9 is regarded as a closed loop pattern. By executing step S33, therefore, closed loop patterns other than such a closed loop pattern for specifying the region of the recognition subject are excluded. The number of closed loop patterns detected by this processing need not be one, but may be two or more. At step S34, the image data in the region surrounded by the closed loop pattern detected at step S33 is output.

Figure 12:
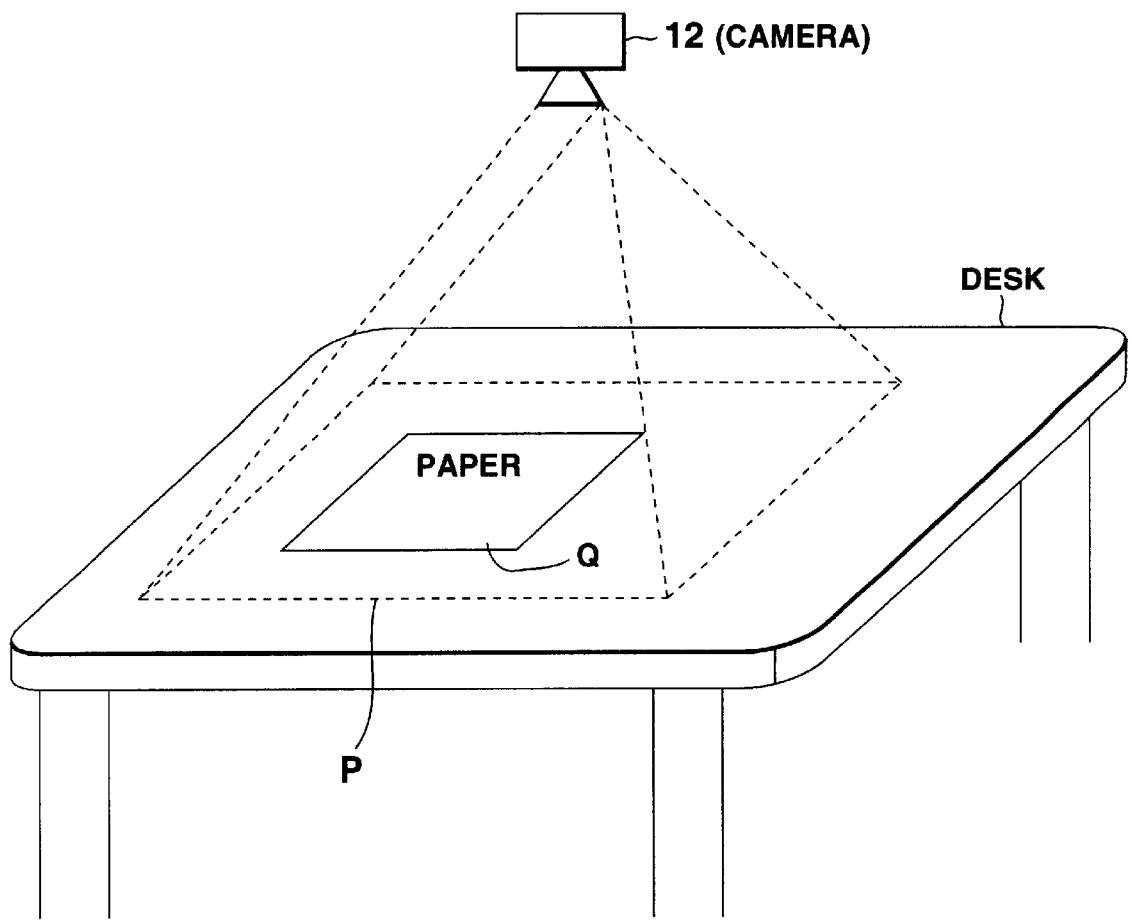
FIG. 12 is a diagram showing an example of application of image processing shown in FIG. 4.

FIG. 12 is a diagram showing an example of application of the above described image processing. As described above, a boundary between regions can be detected by examining the density distribution or color distribution of the image data. In the example shown in FIG. 12, this technique is used. It is now assumed that a memo desired to be subjected to the image recognition is written on paper Q. The paper Q having the memo written thereon is placed on a desk or the like having a color different from that of the paper Q. When imaging the paper Q by using the camera 12, a camera input region P including the paper Q is imaged.

For the image data within the camera input region P thus taken in, step S11 of FIG. 4 is executed. Since the color of the paper is different from the color of the top surface of the desk, the peripheral edge of the paper is detected as a closed loop pattern, and only the image of the paper is extracted as the image data of the recognition subject. If the imaging method is thus changed, the necessary region can be extracted without drawing a closed loop pattern surrounding the memo on paper with a pen or a pencil.

In the example shown in FIGS. 9 or 12, the region of the image recognition subject is distinguished from an unnecessary region by surrounding the handwritten memo with a substantially closed loop pattern. However, a different method may also be used. For example, it may be made a rule to "underline a character string to be recognized" and only the underlined character string may be extracted from the image data taken in by using the camera 12. In the example shown in FIG. 13A, only "Meeting with Mr. K on August 18" is underlined. In this case, alphabetic letters Q through Z are not extracted, and only "Meeting with Mr. K on August 18" is detected.

Figure 14A:
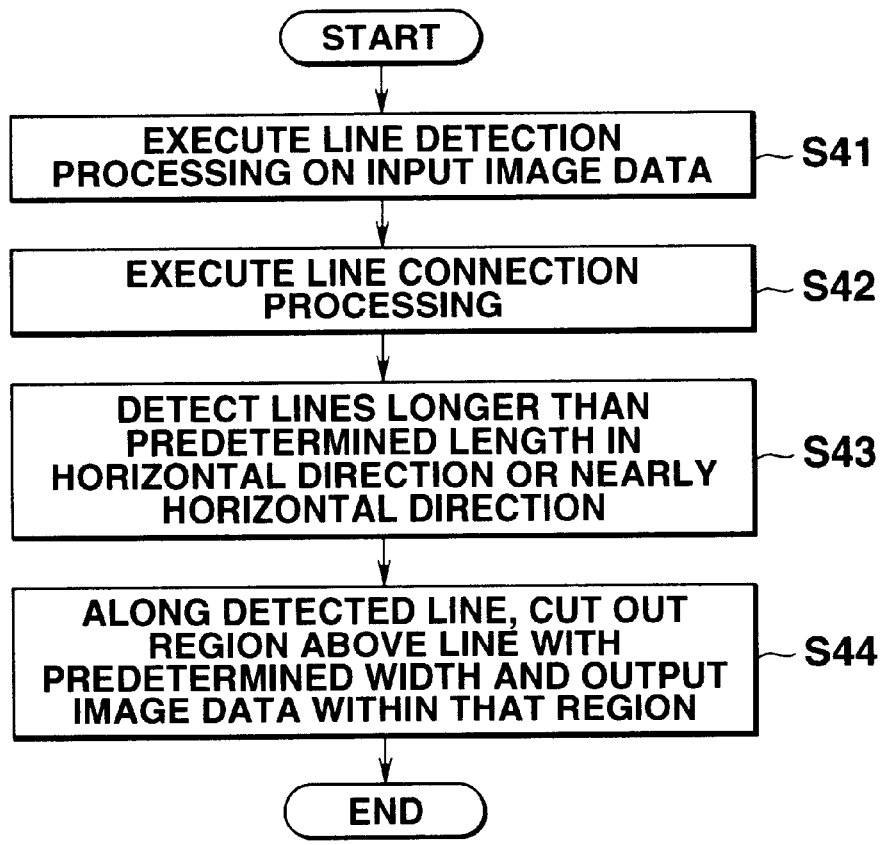
FIGS. 14A and 14B is a flow chart illustrating processing for extracting image data of a recognition subject in the case where a memo or the like is written as shown in FIGS. 13A and 13B.

FIG. 14A is a flow chart illustrating the recognition subject image data extraction processing in the case where the character string to be recognized is identified by underlining. In the flow chart of FIG. 4, this processing is executed as step S11.

Steps S41 and S42 are the same as steps S31 and S32 of FIG. 11, respectively. "Lines" are detected from the image data read by the camera 12, and the "lines" are repaired. Among the "lines" obtained by the above described processing, "lines" longer than a predetermined length in the horizontal direction or a nearly horizontal direction are detected at step S43. The "lines" detected here may be plural. In the example shown in FIG. 13A, two lines are detected. Along each of "lines" detected at step S43, a region above the "line" is cut out with a predetermined width, and the cut out regions are output as recognition subject regions at step S44.

As a method for identifying the subject region of the image recognition, a color may also be used. For example, it is made a rule to "write the character string with a red color." Among the image data taken in by using the camera 12, only the character string written with a red color is extracted. In the example shown in FIG. 13B, only the characters of "Meeting with Mr. K on August 18" are written with a red color, and remaining characters are written with a black color. In this case, the alphabetic letters Q through Z are not extracted, and only "Meeting with Mr. K on August 18" is extracted.

Figure 14B:
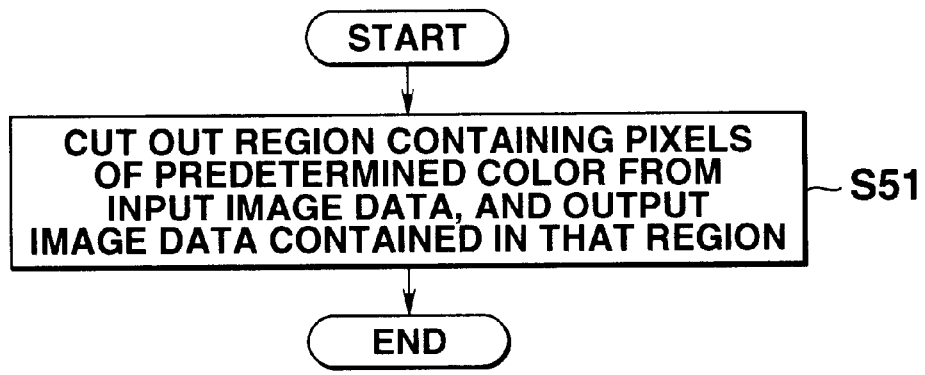

FIG. 14B is a flow chart illustrating the extraction processing of recognition subject image data in the case where the character string of the recognition subject is written with a color specified beforehand for identification. This processing is also executed as step S7 in the flow chart of FIG. 4. At step S51, a region containing pixels of a color specified beforehand with a predetermined density or more is cut out from the image data taken in by using the camera 12, and image data included in the cut out region is output as the recognition subject region. The character string of the recognition subject may be specified by using other character decoration information instead of the underline or color.

Figure 15:
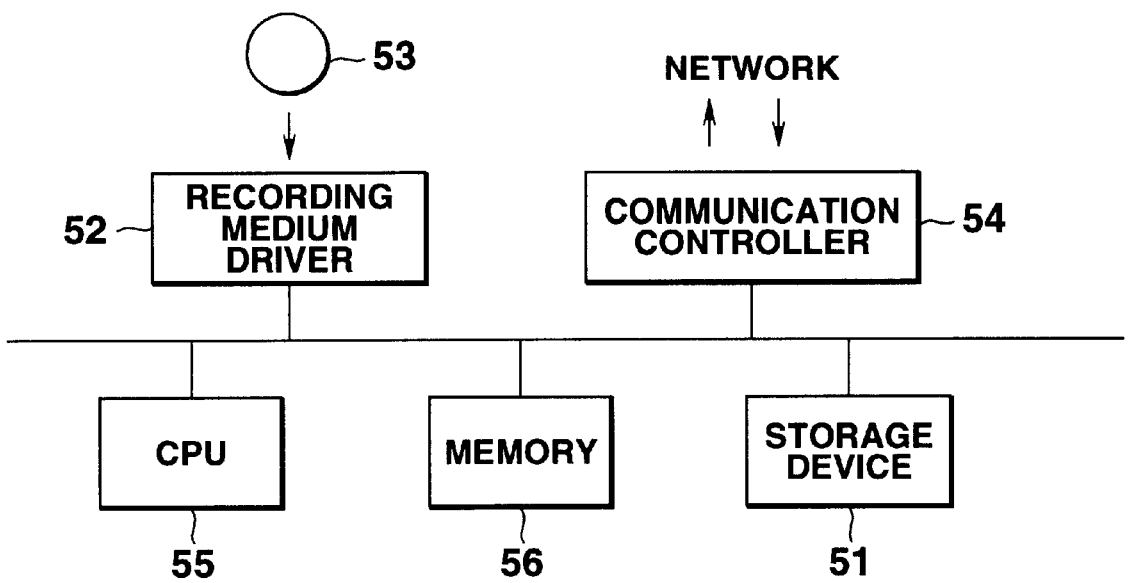
FIG. 15 is a configuration diagram of a host device.

FIG. 15 is a configuration diagram of the host device 4. A storage device 51 is formed by a semi-conductor memory, a magnetic recording medium, or an optical recording medium, and stores programs, data and the like. The storage device 51 may be fixedly mounted in the host device 4, or may be mounted so as to be freely attached and detached.

A recording medium driver 52 is a device for reading out data stored in a detachable recording medium (including a semiconductor memory, a magnetic disk, an optical disk, an optical magnetic disk, or the like) 53, or writing data into the detachable recording medium 53. A communication controller 54 is a unit for controlling exchange of data with respect to the network. Transmission and reception of packets with respect to the portable terminal 1 are also controlled by the communication controller 54.

A CPU 55 loads a program or the like from the storage device 51 or the detachable recording medium 53 into a memory 56, and executes it. The program, data, and the like recorded in the storage device 51 may be obtained by writing the program, data, and the like stored in the detachable recording medium 53 into the storage device 51, or receiving the program, data, and the like from another device on the network via a communication line or the like and recording it into the storage device 51. Furthermore, the CPU 55 may use the program, data, and the like stored in another device installed on the network via a communication line or the like. The image recognition unit 5, the mail transmitting/receiving unit 6, and the fax transmitting/receiving unit 7 shown in FIG. 1 represent the functions executed by the CPU 55 and the program via the communication controller 54 as blocks.

Figure 16:
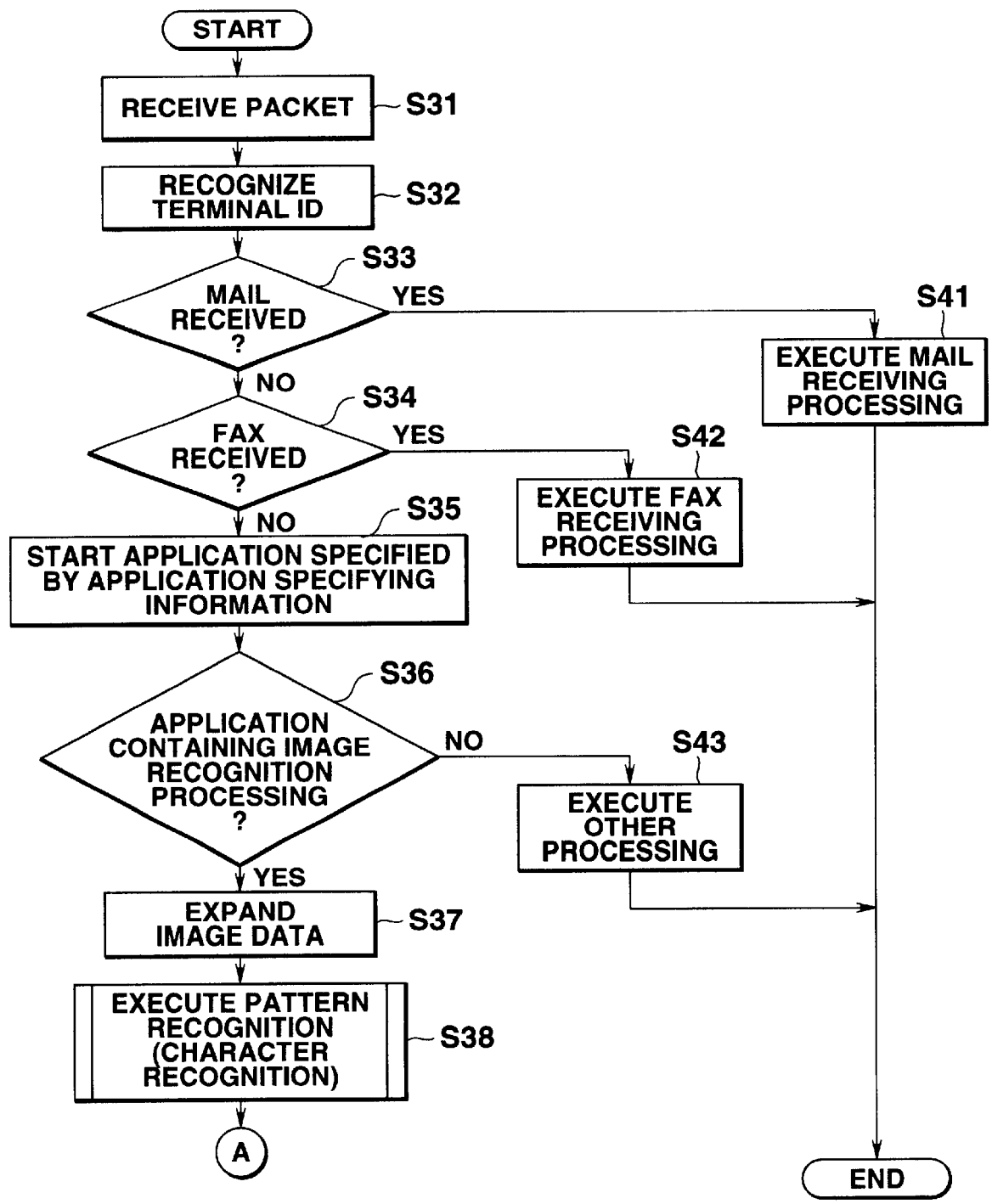
FIGS. 16 and 17 are flow charts illustrating processing of the host device.
Figure 17:
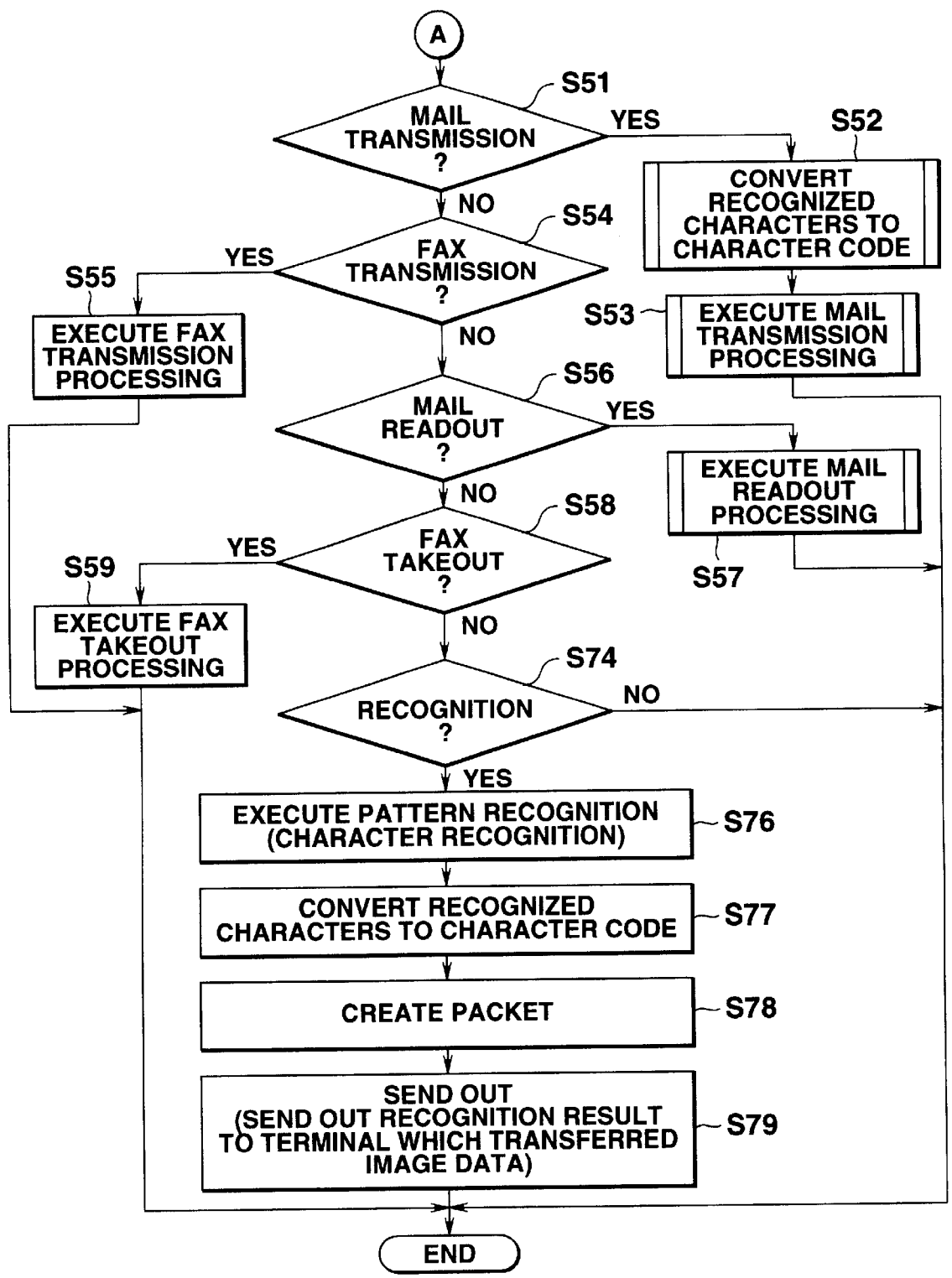

FIGS. 16 and 17 are flow charts illustrating processing of the host device 4. The host device 4 receives a packet (i.e., a packet created by the processing of the flow chart of FIG. 4) sent out from the portable terminal 1, and processes the image data in accordance with information set in its data portion. The operation performed when the host device 4 has received a packet from the network 3 will now be described.

Upon receiving a packet at step S31, the terminal which sent out the packet is recognized by examining the terminal ID set in the packet at step S32. At step S33, it is determined whether the received packet contains e-mail data. If e-mail data is contained, then it is recognized as mail receiving and the processing proceeds to step S41. At step S41, the mail transmitting/receiving unit 6 is started and requested to perform processing concerning mail receiving. The mail transmitting/receiving unit 6 stores the received e-mail by using its destination as a key, and informs the destination user the reception of the mail in response to demands.

At step S34, it is determined whether the received packet contains fax data. If fax data is contained, it is regarded as "fax receiving" and the processing proceeds to step S42. At step S42, the fax transmitting/receiving unit 7 is started and requested to perform processing concerning the fax receiving. The fax transmitting/receiving unit 7 stores the received fax by using its destination as a key, and informs the destination user the reception of the fax as occasion demands.

At step S35, an application specified by the application identification information set in the received packet is started. At step S36, it is determined whether the started application contains image recognition processing. If the application does not contain image recognition processing, processing of that application is executed at step S43. If the application contains image recognition processing, image data contained in the received packet is expanded at step S37 and pattern recognition processing and character recognition processing are executed on the image data at step S38. By this image recognition processing, the service requested by the user is recognized. The recognition processing of step S38 will be described later.

At step S51, it is determined whether the service requested by the user is "mail transmission." If the service is "mail transmission," the processing proceeds to step S52.

At step S52, pattern recognition processing and character recognition processing are executed on the image data expanded at step S37. While the character recognition processing is executed for only a region required to recognize the service requested by the user at step S38, the character recognition processing is executed for the entire region of the expanded image data at step S52. Characters obtained by this character recognition processing are converted to a predetermined character code (such as ASCII code or JIS code). The character code obtained here is mail sentences input by the user by using the portable terminal 1. At step S53, the mail transmitting/receiving unit 6 is started, and the mail transmitting/receiving unit 6 transmits the mail sentences obtained at step S52. Steps S52 and S53 will be described in detail later.

At step S54, it is determined whether the service requested by the user is "fax transmission." If the service is "fax transmission," the processing proceeds to step S55. At step S55, the fax transmitting/receiving unit 7 is started, and the fax transmitting/receiving unit 7 transmits the image data expanded at step S37 to a transmission destination specified in the image.

At step S56, it is determined whether the service requested by the user is "mail readout." If the service is "mail readout" the processing proceeds to step S57. At step S57, the mail transmitting/receiving unit 6 is started. If mail having the terminal ID detected at step S32 as its destination is received, the mail transmitting/receiving unit 6 transmits the mail to the terminal having the terminal ID. Step S57 will be described later.

At step S58, it is determined whether the service requested by the user is "fax takeout." If the service is "fax takeout" the processing proceeds to step S59. At step S59, the fax transmitting/receiving unit 7 is started. If fax having the terminal ID detected at step S32 as its destination is received, the fax transmitting/receiving unit 7 transmits the fax to the terminal having the terminal ID.

If the service is judged at step S74 to be recognition service, then the image data stored in the received packet is expanded at step S76, and the pattern recognition processing and the character recognition processing are executed on the image data at step S76. The image data subjected to the recognition processing is the image data extracted at step S11 of FIG. 4. In other words, in the example of FIG. 9 or 13, the image recognition processing is executed on the image data of the region containing only "Meeting with Mr. K on August 18." As a result of this image recognition processing, therefore, only the content written by the user as the memo are recognized.

If the result of recognition at step S76 contains characters, the characters are converted to a character code (such as ASCII code or JIS code) at step S77. At step S78, a packet for returning the recognition result to the portable terminal 1 is created. In other words, the transmission destination address of this packet is the portable terminal 1, and the above described recognition result is stored in its data portion. At step S79, the created packet is sent out to the network 3.

The packet sent out to the network 3 at step S79 is transmitted to the portable terminal 1. Upon receiving this packet, the portable terminal 1 displays the result of the image recognition processing executed by the host device 6 on the LCD display unit 11. Furthermore, the recognition result is stored within the portable terminal 1 based on the user's command.

As described above, this result of the image recognition may be stored in the host device 4. In this case, the recognition result is stored so as to be associated with the terminal ID of the terminal device which sent out the difference image data (i.e., the portable terminal 1). Furthermore, this recognition result may be transmitted to a predetermined terminal device specified beforehand. In addition, retrieval processing may be executed by using a character string contained in this recognition result as a keyword, or the character string may be translated to a predetermined language. In this case, the retrieval result or the translation result is sent to the portable terminal 1.

There is a strong demand for reduction of portable terminals in size, weight and cost. In the application of the present embodiment, these demands can be met by shifting a part of the processing executed by the portable terminal to the host device. For example, it is possible to cause the host device 4 to execute the processing of step S11 of the flow chart of FIG. 4. As described above, step S11 contains the image processing. If it is attempted to implement such processing with high precision or in a short time, a processor having high processing capability and a large size program are in general needed. Therefore, it is effective in reducing the size, weight and cost of the portable terminal 1 to cause the host device 4 to execute the processing of step S11.

In the case where the host device 4 is made to execute the processing of step S11, the portable terminal 1 sends the image data read by using the camera 12 to the host device 4 as it is. In the flow chart of FIG. 17, the host device 4 executes the processing of step S11 after the processing of step S75.

As described above, the image processing system of the present embodiment is so structured that an image of paper having a memo written thereon is taken in by a camera or the like of the portable terminal 1 and the host device 4 executes the recognition processing for only a required region in that image. By providing the portable terminal 1 with a function of taking in the image and transmitting it to the host device 4 and a function of requesting the host device 4 to execute processing (and in some configuration, a function of extracting a required region), therefore, the content of the written memo can be converted to an electronic file with such a simple interface that a handwritten memo or the like is input by using a camera.

Figure 18:
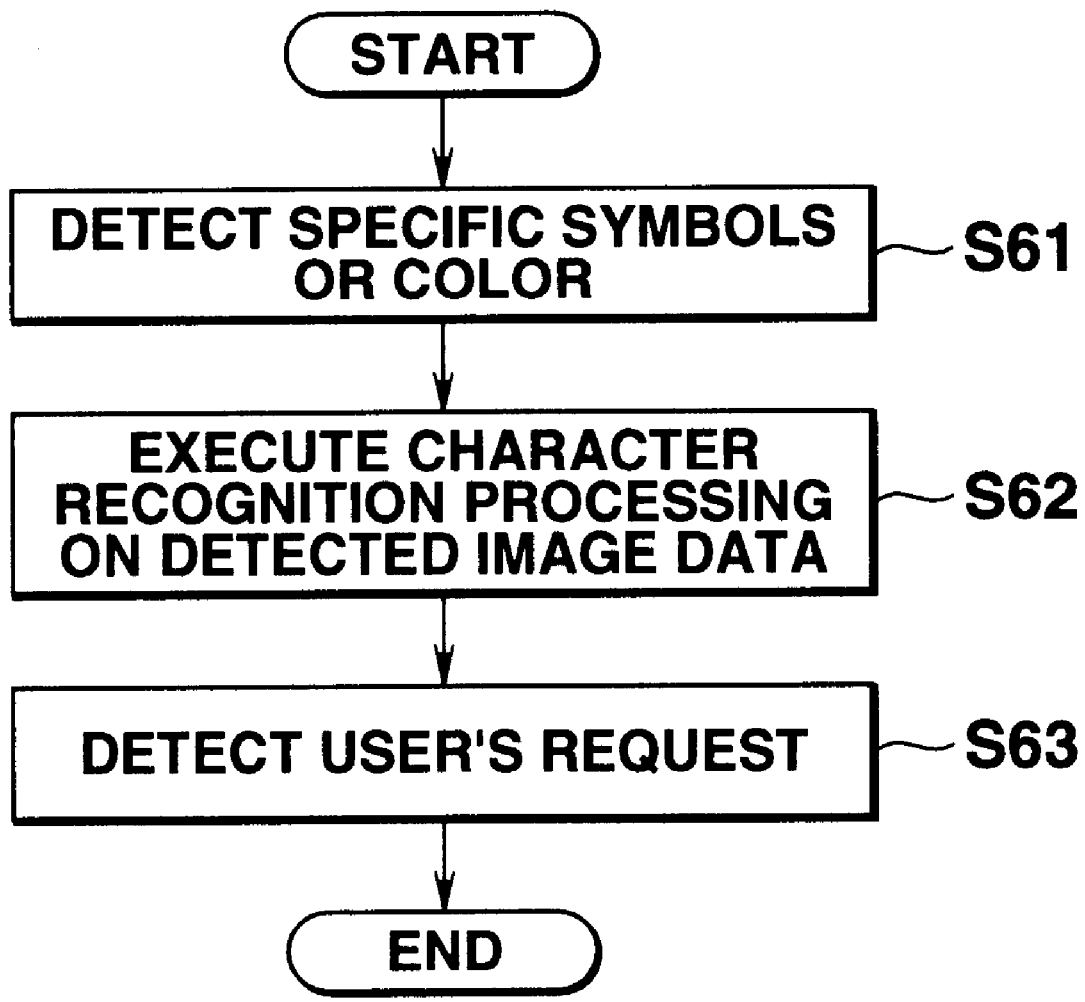
FIG. 18 is a flow chart illustrating processing for recognizing service requested by the user from received image data.

FIG. 18 is a detailed flow chart of step S38 of FIG. 16. By executing the pattern recognition processing and the character recognition processing on the image data stored in the received packet, the service requested by the user is detected.

At step S61, a specific symbol or color is detected from the received image data in accordance with a predetermined rule. For example, in the case where brackets are used as symbols indicating the positions of a character string specifying the service or a character string specifying the transmission destination as shown in FIG. 5A, the image inside the brackets is extracted. In the case where the service classification is associated with a color and the transmission destination is specified by using a character string represented by a specific color as shown in FIG. 5B, a region using the specific color is extracted.

Figure 19:
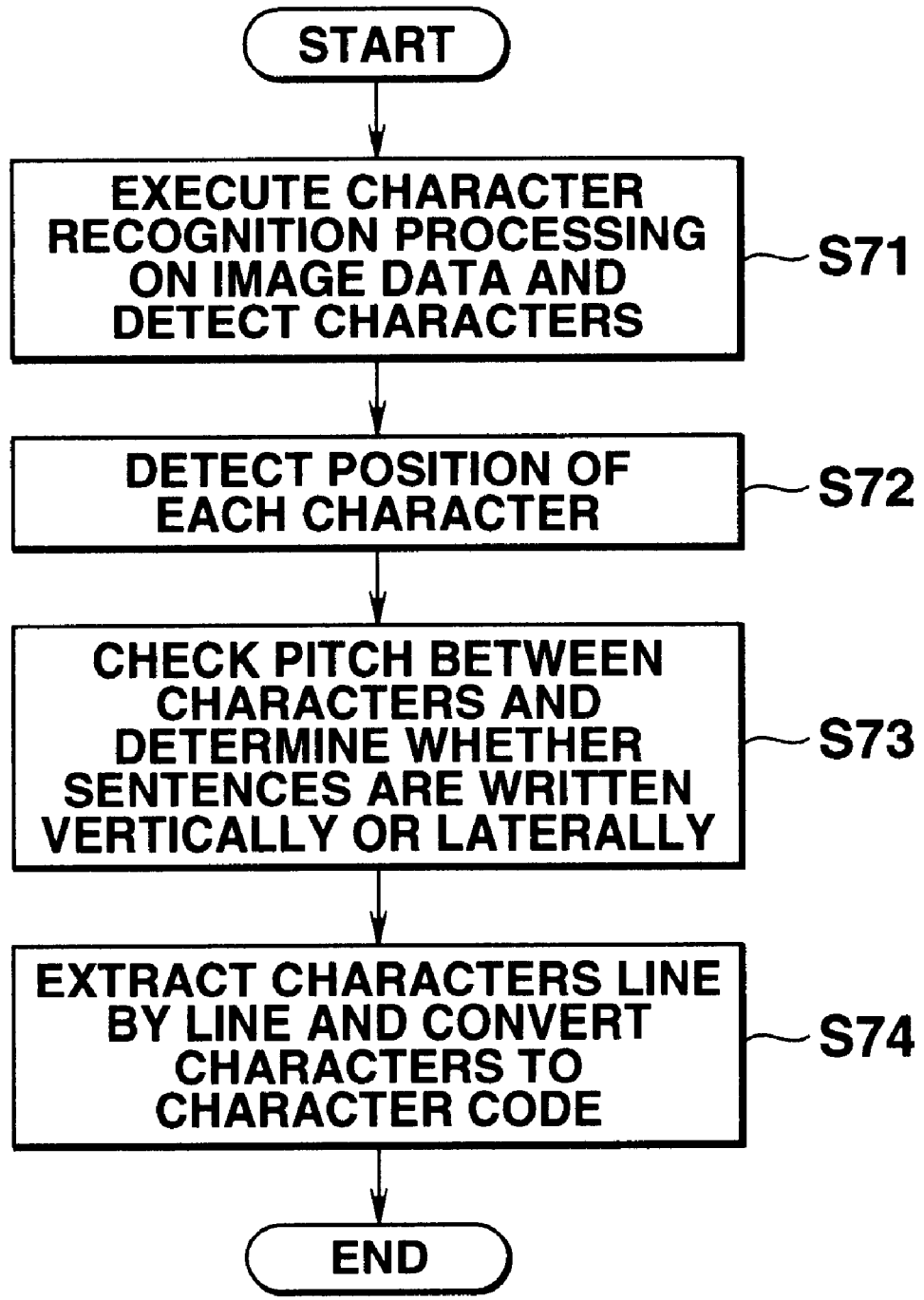
FIG. 19 is a flow chart illustrating processing for extracting a character string of mail sentences from received image data.

At step S62, character recognition processing is executed on the image data extracted at step S61. At step S63, the service requested by the user is detected from the result of the character recognition processing. In the example shown in FIGS. 5A or 5B, the address of the transmission destination of e-mail is detected simultaneously with detection that the service requested by the user is "e-mail transmission." FIG. 19 is a detailed flow chart of step S52 of FIG. 17, and shows the processing for detecting each character code of the character string to be transmitted as the mail sentences.

At step S71, character recognition processing is executed on the received image data, and characters imaged by the portable terminal 1 are recognized. Here, the character recognition processing is not executed for the region processed at step S38.

At step S72, the position of each of the characters detected at step S71 is detected. For example, the center position of each character is detected as a relative position with respect to the top left-hand corner of the screen imaged by using the camera.

At step S73, the pitch between characters is checked, and it is determined whether the sentences are written vertically or laterally. In the case of lateral writing, the pitch between characters in the lateral direction is in general smaller than the pitch between characters in the vertical direction. In the case of vertical writing, the pitch between characters in the vertical direction is in general smaller than the pitch between characters in the lateral direction. Here, this property is utilized.

At step S74, characters are extracted in the direction obtained at step S73. For example, in the case of sentences written laterally, characters on a top line are extracted from the left to the right one by one. Thereafter, the same processing is executed for the lower lines in order. These extracted characters are converted to a character code and stored in order character by character.

By the above described processing, characters of sentences imaged by using the portable terminal 1 by the user are extracted in order and converted to character codes.

Figure 20:
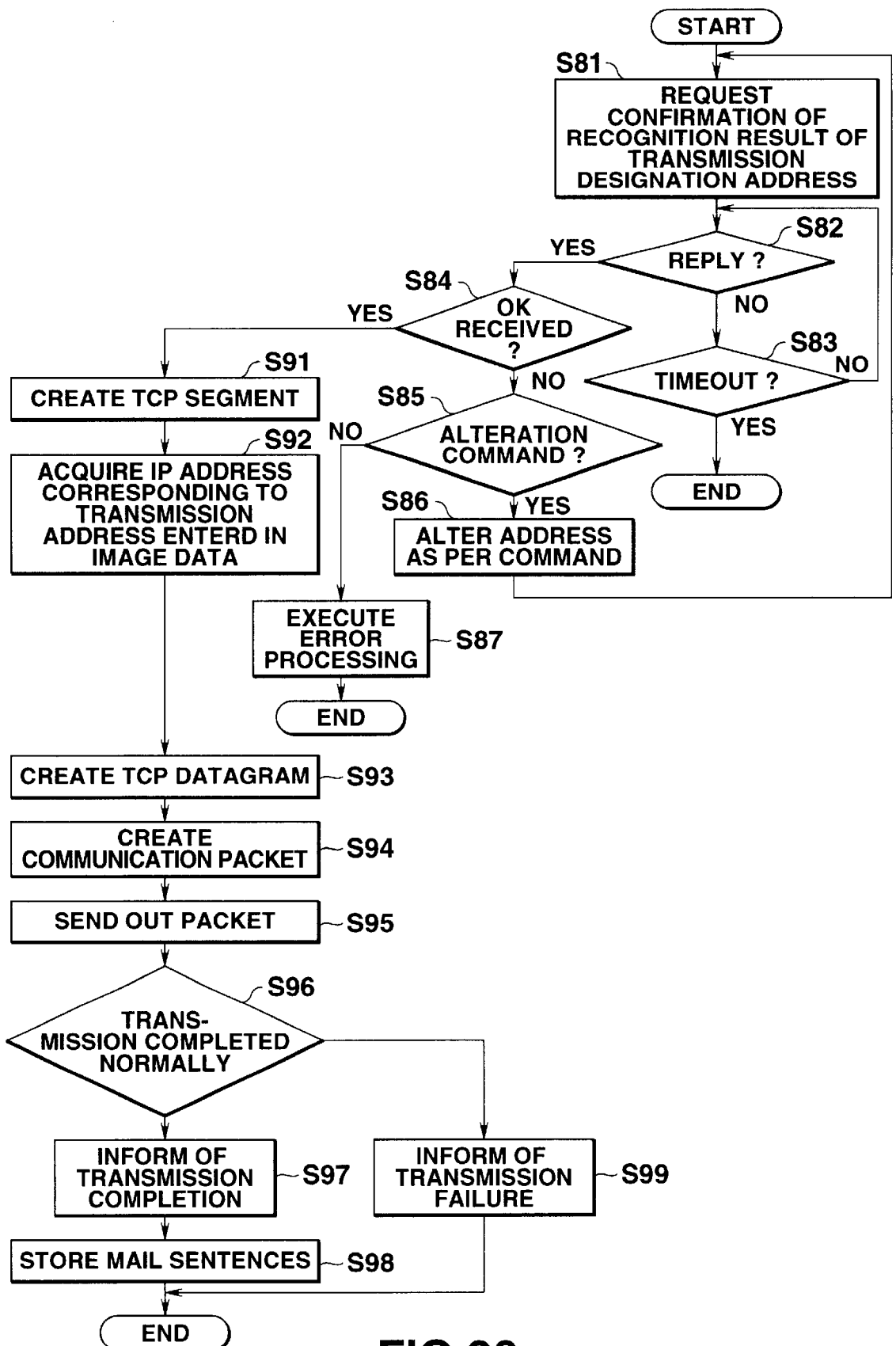
FIG. 20 is a flow chart illustrating mail transmission processing.

FIG. 20 is a detailed flow chart of step S53 of FIG. 17, and shows the mail transmission processing. This processing is executed by the mail transmitting/receiving unit 6 of FIG. 1.

At step S81, the transmission destination address obtained at step S38 is confirmed by the user of the portable terminal 1. In other words, the transmission destination address obtained by the image recognition processing at step S38 is transmitted to the terminal having the terminal ID detected at step S32, and an inquiry is made whether the transmission destination address is correct. Upon receiving this inquiry, the portable terminal 1 displays the received transmission destination address on the display unit, and waits for a user's command.

At steps S82 and S83, a reply from the portable terminal 1 is waited for. If there is no reply in a predetermined time, the processing ends. On the other hand, if there is a reply, it is determined at steps S84 and S85 whether the reply is "OK: transmission destination address confirmed." In the case of "OK," the processing proceeds to step S91. If an alteration command is contained, then the address is altered in accordance with that command at step S86, and the processing returns to step S81. If the reply from the portable terminal 1 is neither "OK" nor an alteration command, error processing is executed at step S87.

Figure 21:
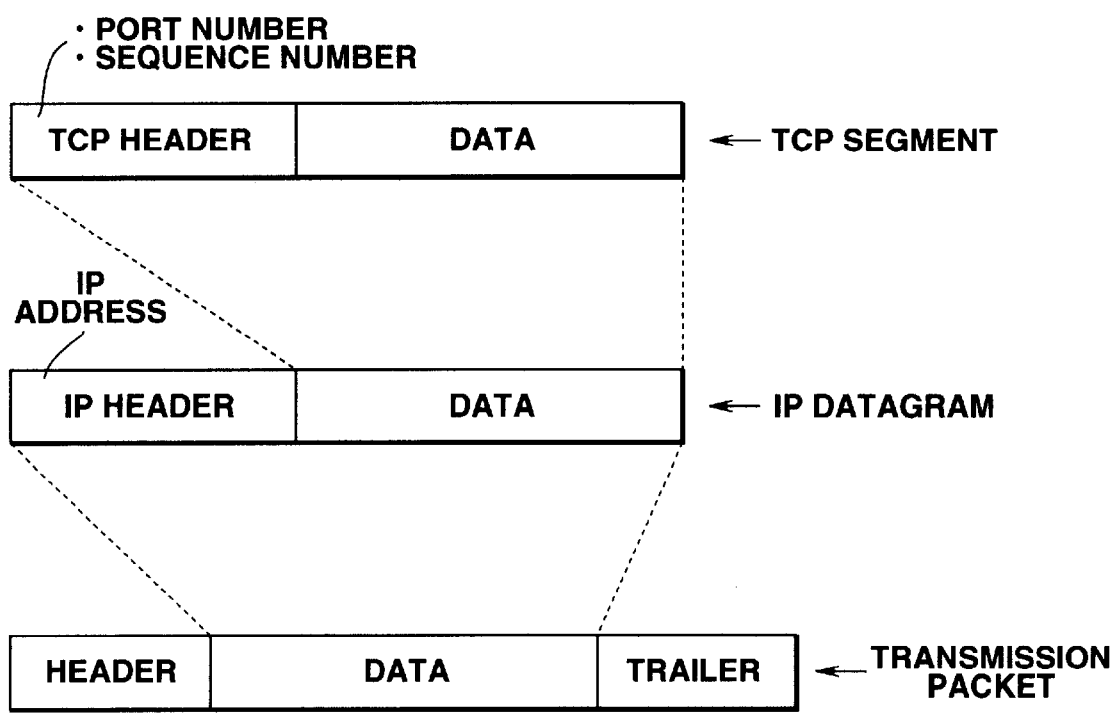
FIG. 21 shows a diagram illustrating a packet storing mail sentences.

At step S91, a TCP segment shown in FIG. 21 is created. In other words, a port number, a sequence number, and the like are set in a TCP header. The port number is, for example, a number specifying an SMTP. As for data, the character string obtained at step S52 is stored as mail sentences.

At step S92, an IP address corresponding to the transmission destination address included in the image data is acquired. The IP address is acquired by, for example, inquiring of a DNS (domain name server) which is present on the network and which is not illustrated. At step S93, an IP datagram shown in FIG. 21 is generated. In a header of the IP datagram generated here, the IP address acquired at step S92 is set. A data portion of the IP datagram has a TCP segment stored therein.

At step S94, a transmission packet shown in FIG. 21 is generated. A data portion of the transmission packet has the above described IP packet stored therein. The format of this packet is determined by a communication protocol on the network 3 to which the host device 4 is connected. At step S95, the transmission packet created at step S94 is sent out to the network 3.

At step S96, it is determined whether the above described transmission packet could be sent out normally. When the transmission packet could be sent out normally, the portable terminal 1 is informed at step S97 that the mail transmission is completed and the transmitted mail is stored in the host device 4 at step S98. On the other hand, when the above described transmission packet could not be sent out normally, the portable terminal 1 is informed of that fact.

Figure 22:
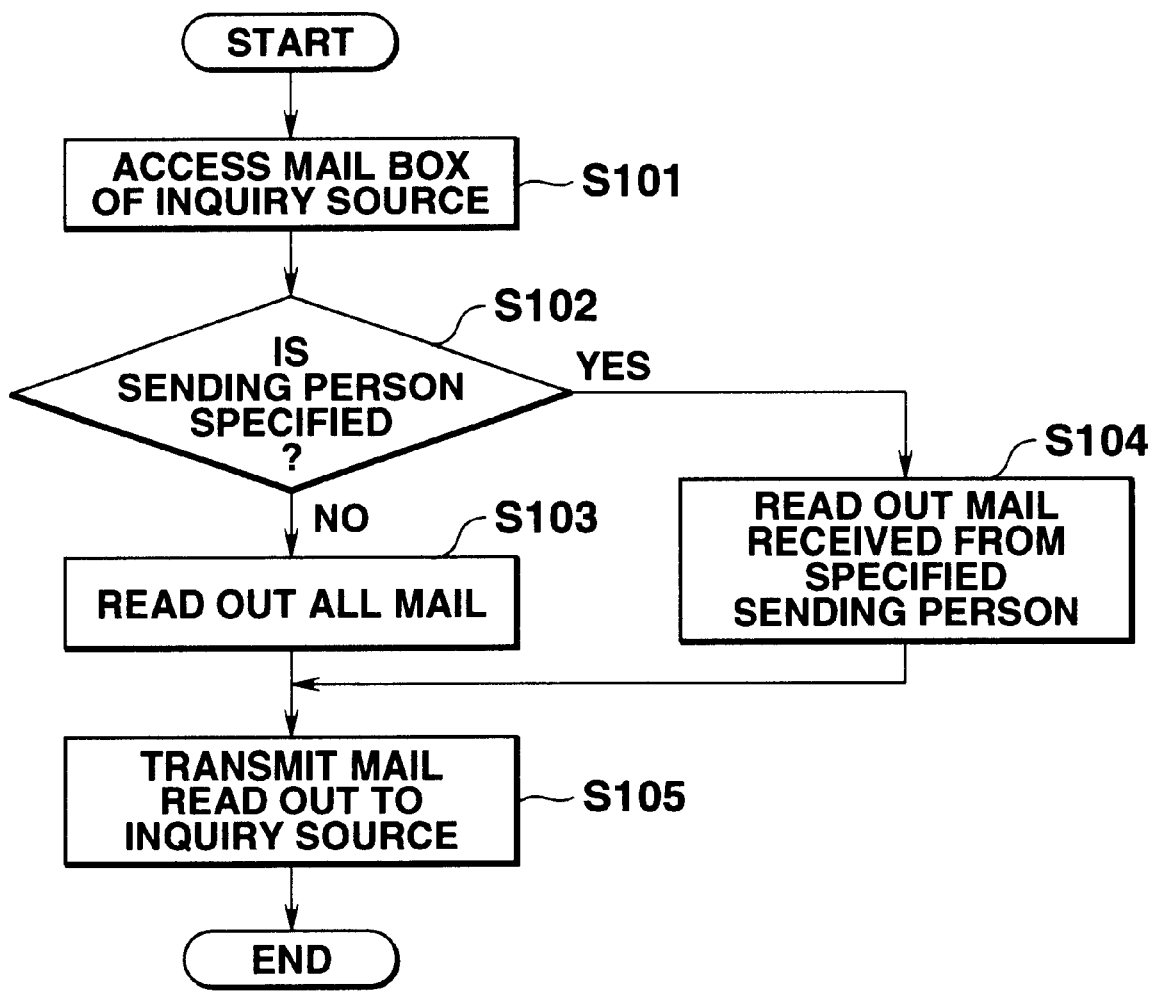
FIG. 22 is a flow chart illustrating processing performed when a mail inquiry is received from another terminal.

FIG. 22 is a detailed flow chart of step S57 of FIG. 17, and shows the processing of reading out mail stored in the host device 4 from the portable terminal 1. This processing is executed in, for example, the following situation. Mail directed to the user of the portable terminal 1 is received by the mail transmitting/receiving unit 6. The mail transmitting/receiving unit 6 administers the mail. In this situation, the portable terminal 1 images the memo as shown in FIG. 7 by using the camera 12 and transmits the image data to the host device 4.

At step S101, the mail box of the terminal (user) of the inquiry source is accessed. This terminal is identified by the terminal ID detected at the above described step S32. By the way, mail arrived at the mail transmitting/receiving unit 6 is put in a specific mail box according to its destination. For example, if mail directed to the user of the portable terminal 1 has arrived, the mail transmitting/receiving unit 6 stores it in the mail box installed for the user of the portable terminal 1. By access using the terminal ID detected at step S32 as a key, therefore, the letter directed to that terminal (user) can be read out.

At step S102, it is determined whether there is specification of a mail sending person by executing the character recognition processing on the received image data. If there is no specification, all mail stored in the mail box of that terminal is read out at step S103. On the other hand, if there is specification of a mail sending person, only the mail from that mail sending person is read out at step S104. In the case of the example shown in FIG. 7, only the mail sent from Mr. K is read out. At step S105, the mail read out is sent to the terminal of the inquiry source.

Figure 23:
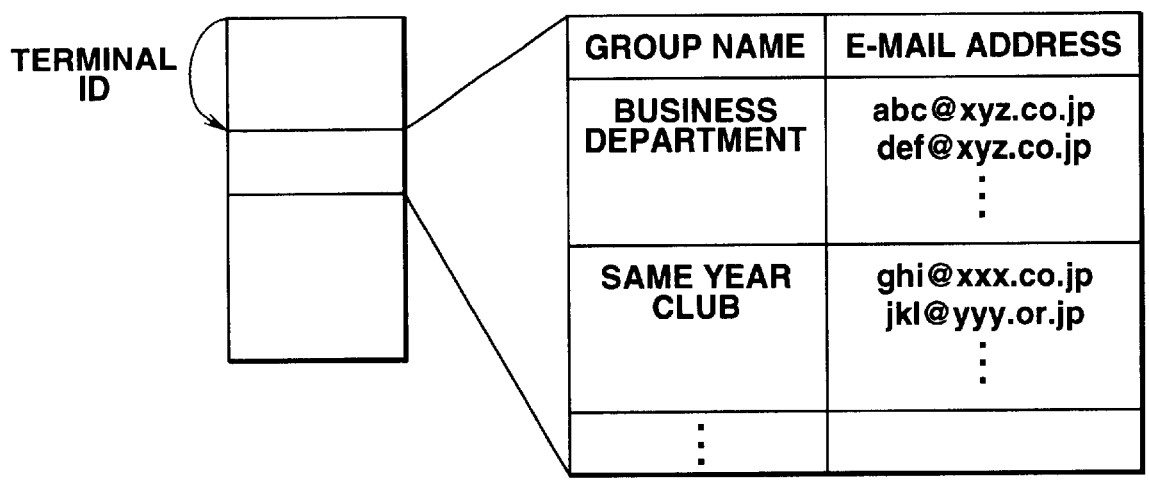
FIG. 23 is a configuration diagram of a table storing e-mail addresses belonging to each group so as to be associated with a group name.

In the above described embodiment, a certain address is specified as the transmission destination of an e-mail. Alternatively, a group including a plurality of terminals may be specified. In this case, it is necessary to register a table as shown in FIG. 23 in the mail transmitting/receiving unit 6 beforehand. It is now assumed that the table of FIG. 23 is set and the transmission destination address of FIG. 5A is replaced by "Business department." Such a memo is input by the camera 12 and its image data is transmitted to the host device 4. By executing the character recognition processing on the received image data, the host device 4 recognizes that the mail transmission destination is the "business department." If at this time the table of FIG. 23 is accessed by using the terminal ID of the portable terminal 1, one or more e-mail addresses belonging to the "business department" are obtained. The ensuing processing is the same as the foregoing description.

In the above described embodiment, the processing programs executed by the host device 4, i.e., the programs implementing the functions shown in the flow charts of FIGS. 16 through 20, and FIG. 22, and the program for interpreting and processing the information transmitted via the network are stored beforehand in the storage device 51 or the detachable recording medium 53 in a form of a program code which can be read by the CPU 55. Or programs stored in another device connected via the network are used.

FIGS. 19 through 23 show operation for an e-mail transmission. Basically, the operation for a fax transmission is also the same. When transmitting a fax, however, it is necessary to detect the telephone number of the transmission destination by executing the image recognition processing on the received image data. For the content to be transmitted as fax (fax sentences), however, it is not necessary to execute the recognition processing.

In the above described embodiment, such a configuration as to take in image data by using a camera is shown. However, the present invention is not limited to this configuration. For example, image data read by using an image scanner may be transmitted to the host device.

Thus, in the image data processing system according to the present embodiment, image data taken in by the portable terminal 1 is transmitted to the host device 4. By analyzing the image data, the host device 4 recognizes the service requested by the user of the portable terminal 1, and transmits the transfer data contained in the image data as an e-mail or a fax according to the destination information contained in the image data. Therefore, by providing the portable terminal 1 only with the function of taking in image data or the like and transmitting it to the host device 4 and the function of requesting the host device 4 to execute processing, an e-mail or the like can be transmitted with such user interface that a handwritten memo or the like is imaged by a camera. In other words, the portable terminal 1 need no execute high precision pattern recognition processing and various kinds of processing requiring high speed processing. Therefore, the portable terminal 1 can enjoy results of sophisticated image processing executed in the host device 4 without having a memory of large capacity or a processor of high performance.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A host device configured to be connected to a terminal device which transmits a document to the host device through a network, the document including a destination written therein with a predetermined indicator, the host device comprising:

a receiver configured to receive an image of the document transmitted from the terminal device through the network;

an extraction section configured to extract a destination image from the received image based on the predetermined indicator;

a character recognition circuit configured to execute a character recognition of the extracted destination image to recognize the transmission destination; and a transmitter configured to transmit the received image to another device determined by the recognized destination, wherein the destination, the command and the predetermined indicator are hand-written.

2. The host device according to claim 1, wherein said document to be by the terminal device includes a to-be-transmitted image and the recognized destination is handwritten on the document in a different manner so as to be distinguishable from the to-be-transmitted image, the different manner being determined by the predetermined indicator.

3. The device according to claim 1, wherein said destination is written in the document by a predetermined color.

4. The device according to claim 1, wherein said destination is written in the document with an underline.

5. The device according to claim 1, wherein said destination is written in the document with a pair of brackets.

6. A host device configured to be connected to a terminal device which transmits a document to the host device through a network, the document including a command written therein with a predetermined indicator, the host device comprising:

a receiver configured to receive an image of the document transmitted from the terminal device through the network;

an extraction section configured to extract a command image from the received image based on the predetermined indicator;

a character recognition circuit configured to execute a character recognition of the extracted command image to recognize the command; and a transmitter configured to transmit the received image to another device in a manner which is determined by the recognized command, wherein the destination, the command and the predetermined indicator are handwritten.

7. The host device according to claim 6, wherein said document to be by the terminal device includes a to-be-transmitted image and the command is hand-written on the document in a different manner so as to be distinguishable from the to-be-transmitted image, the different manner being determined by the predetermined indicator.

8. The host device according to claim 6, wherein said document to be by the terminal device includes an e-mail transmission command and said transmitter transmits a to-be-transmitted image to the another device by e-mail.

9. The host device according to claim 6, wherein said document to be by the terminal device includes a facsimile transmission command and said transmitter transmits a to-be-transmitted image to the another device by facsimile.

10. The device according to claim 6, wherein said command is written in the document by a predetermined color.

11. The device according to claim 6, wherein said command is written in the document with an underline.

12. The device according to claim 6, wherein said command is written in the document with a pair of brackets.

13. A host device configured to be connected to a terminal device which transmits a document to the host device through a network, the document including a destination and a command written therein with a predetermined indicator, the host device comprising:

a receiver configured to receive an image of the document transmitted from the terminal device through the network;

an extraction section configured to extract a destination image and a command image from the received image based on the predetermined indicator;

a character recognition circuit configured to execute a character recognition of the extracted destination image and command image to recognize the transmission destination and the command; and a transmitter configured to transmit the received image to another device determined by the recognized destination in a manner which is determined by the recognized command, wherein the destination, command and the predetermined indicator are hand-written.

14. The host device according to claim 13, wherein said document to be by the terminal device includes a to-be-transmitted image, the recognized destination, and the command are hand-written on the document in a different manner so as to be distinguishable from the to-be-transmitted image, the different manner being determined by the predetermined indicator.

15. The host device according to claim 13, wherein said document to be by the terminal device includes an e-mail transmission command and said transmitter transmits a to-be-transmitted image to the another device by e-mail.

16. The host device according to claim 13, wherein said document to be by the terminal device includes a facsimile transmission command and said transmitter transmits a to-be-transmitted image to the another device by facsimile.

17. The device according to claim 13, wherein said destination is written in the document by a predetermined color.

18. The device according to claim 13, wherein said destination is written in the document with an underline.

19. The device according to claim 13, wherein said destination is written in the document with a pair of brackets.

20. A terminal device connected to a host device through a network, the terminal device comprising:

an image input device; and a transmitter configured to transmit an image of the document input by the image input device to the host device through the network, the document including a destination which is written on the document with a predetermined indicator, wherein the host device receives the image transmitted from the terminal device through the network, extracts a destination image from the received image based on the predetermined indicator, executes a character recognition of the extracted destination image to recognize the transmission destination, and transmits the received image to another device determined by the recognized destination, and the destination and the predetermined indicator are hand-written.

21. A terminal device connected to a host device through a network, the terminal device comprising:

an image input device; and a transmitter configured to transmit an image of the document input by the image input device to the host device through the network, the document including a command for the host device which is written on the document with a predetermined indicator, wherein the host device receives the image transmitted from the terminal device through the network, extracts a command image from the received image based on the predetermined indicator, executes a character recognition of the extracted command image to recognize the command, and transmits the received image to another device in a manner determined by the recognized command, and the command and the predetermined indicator are hand-written.

22. The terminal device according to claim 21, wherein said document includes an e-mail transmission command.

23. The terminal device according to claim 21, wherein said document includes a facsimile transmission command.

24. A terminal device connected to a host device through a network, the terminal device comprising:

input by the image input device; and a transmitter configured to transmit an image of the document input by the image input device to the host device through the network, the document including a destination and a command written on the document with a predetermined indicator, wherein the host device receives the image transmitted from the terminal device through the network, extracts a destination image and a command image from the received image based on the predetermined indicator, executes a character recognition of the extracted destination and command image to recognize the transmission destination and command, and transmits the received image to another device determined by the recognized destination in a manner determined by the recognized command, and the destination, the command and the predetermined indicator are hand-written.

25. The terminal device according to claim 24, wherein said document includes an e-mail transmission command.

26. The terminal device according to claim 24, wherein said document includes a facsimile transmission command.

27. A method of transmitting a document from a terminal device to a host device through a network, the document including a destination written therein with a predetermined indicator, the method comprising the steps of:

receiving an image of the document transmitted from the terminal device through the network;

extracting a destination image from the received image based on the predetermined indicator;

executing a character recognition of the extracted destination image to recognize the destination; and transmitting the received image to another device determined by the recognized destination, wherein the destination and the predetermined indicator are hand-written.

28. The method according to claim 27, wherein said document to be by the terminal device includes a to-be-transmitted image and the recognized destination is hand-written on the document in a different manner so as to be distinguishable from the to-be-transmitted image, the different manner being determined by the predetermined indicator.

29. A method of transmitting a document from a terminal device to a host device through a network, the document including a command written therein with a predetermined indicator, the method comprising the steps of:

receiving an image of document transmitted from the terminal device through the network;

extracting a command image from the received image based on the predetermined indicator;

executing a character recognition of the extracted command image to recognize the command; and transmitting the received image to another device in a manner which is determined by the recognized command, wherein the command and the predetermined indicator are hand-written.

30. The method according to claim 29, wherein said document to be by the terminal device includes a to-be-transmitted image and the command is hand-written on the document in a different manner so as to be distinguishable from the to-be-transmitted image, the different manner being determined by the predetermined indicator.

31. The method according to claim 29, wherein said document to be by the terminal device includes an e-mail transmission command and said transmitter transmits a to-be-transmitted image to the another device by e-mail.

32. The method according to claim 29, wherein said document to be by the terminal device includes a facsimile transmission command and said transmitter transmits a to-be-transmitted image to the another device by facsimile.

33. A method of transmitting a document from a terminal device to a host device through a network, the document including a destination and command written therein with a predetermined indicator, the method comprising the steps of:

receiving an image of the document transmitted from the terminal device through the network;

extracting a destination image and a command image from the received image based on the predetermined indicator;

executing a character recognition of the extracted destination image and command image to recognize the destination and the command; and transmitting the received image to another device determined by the recognized destination in a manner which is determined by the recognized command, wherein the destination, the command and the predetermined indicator are hand-written.

34. The method according to claim 33, wherein said document to be by the terminal device includes a to-be-transmitted image, the recognized destination, and the command are hand-written on the document in a different manner so as to be distinguishable from the to-be-transmitted image, the different manner being determined by the predetermined indicator.

35. The method according to claim 33, wherein said document to be by the terminal device includes an e-mail transmission command and said transmitter transmits a to-be-transmitted image to the another device by e-mail.

36. The method according to claim 33, wherein said document to be by the terminal device includes a facsimile transmission command and said transmitter transmits a to-be-transmitted image to the another device by facsimile.

37. A method of transmitting an image of a document from a terminal device, which is coupled to a host device, through a network, the method comprising the steps of:

transmitting an image of the document to the host device through the network, the document including a destination which is written on the document with a predetermined indicator;

receiving the image transmitted from the terminal device through the network;

extracting a destination image from the received image based on the predetermined indicator;

executing a character recognition of the extracted destination image to recognize the transmission destination; and transmitting the received image to another device determined by the recognized destination, wherein the destination and the predetermined indicator are hand-written.

38. A method of transmitting an image of a document from a terminal device, which is coupled to a host device, through a network, the method comprising the steps of:

transmitting an image of the document to the host device through the network, the document including a command for the host device which is written on the document with a predetermined indicator;

receiving the image transmitted from the terminal device through the network;

extracting a command image from the received image based on the predetermined indicator;

executing a character recognition of the extracted destination image to recognize the command; and transmitting the received image to another device in a manner which is determined by the recognized command, wherein the command and the predetermined indicator are hand-written.

39. The method according to claim 38, wherein said document includes an e-mail transmission command.

40. The method according to claim 38, wherein said document includes a facsimile transmission command.

41. A method of transmitting an image of a document from a terminal device, which is coupled to a host device, through a network, the method comprising the steps of:

transmitting an image of the document to a host device through the network, the document including a destination and a command for the host device which are written on the document with a predetermined indicator;

receiving the image transmitted from the terminal device through the network;

extracting a destination image and command image from the received image based on the predetermined indicator;

executing a character recognition of the extracted destination image to recognize the transmission destination; and transmitting the received image to another device determined by the recognized destination in a manner which is determined by the recognized commands, wherein the destination, the command and the predetermined indicator are hand-written.

42. The method according to claim 41, wherein said document includes an e-mail transmission command.

43. The method according to claim 41, wherein said document includes a facsimile transmission command.

* * * * *